(12) United States Patent
Alvarez et al.

(10) Patent No.: US 8,793,187 B2
(45) Date of Patent: Jul. 29, 2014

(54) SELF-SERVICE MONEY REMITTANCE WITH AN ACCESS CARD

(75) Inventors: David R. Alvarez, San Bruno, CA (US); Mitchell A. Shapiro, San Bruno, CA (US)

(73) Assignee: Nexxo Financial Corporation, Burlingame, CA (US)

(*) Notice: Subject to any disclaimer, the term of this patent is extended or adjusted under 35 U.S.C. 154(b) by 27 days.

(21) Appl. No.: 11/657,425

(22) Filed: Jan. 23, 2007

(65) Prior Publication Data

US 2007/0168283 A1   Jul. 19, 2007

Related U.S. Application Data

(63) Continuation-in-part of application No. 10/966,958, filed on Oct. 15, 2004, now Pat. No. 8,204,829.

(60) Provisional application No. 60/512,290, filed on Oct. 17, 2003.

(51) Int. Cl.
*G06Q 40/00* (2012.01)

(52) U.S. Cl.
USPC .................................. 705/41; 705/40; 705/39

(58) Field of Classification Search
USPC ..................... 705/35, 39, 26, 41, 40; 235/379
See application file for complete search history.

(56) References Cited

U.S. PATENT DOCUMENTS

| | | | |
|---|---|---|---|
| 5,350,906 A | 9/1994 | Brody et al. | |
| 5,440,108 A | 8/1995 | Tran et al. | |
| 5,649,118 A | 7/1997 | Carlisle et al. | |
| 5,686,713 A | 11/1997 | Rivera | |
| 5,864,830 A | 1/1999 | Armetta et al. | |
| 5,897,625 A | 4/1999 | Gustin et al. | |
| 5,937,396 A | 8/1999 | Konya | |
| 5,940,811 A | 8/1999 | Norris | |
| 5,949,046 A | 9/1999 | Kenneth et al. | |

(Continued)

FOREIGN PATENT DOCUMENTS

| | | |
|---|---|---|
| FR | 2 790 128 | 8/2000 |
| WO | WO 96/36936 | 11/1996 |
| WO | WO 97/10562 | 3/1997 |
| WO | WO9710560 | 3/1997 |

OTHER PUBLICATIONS

U.S. Appl. No. 10/966,958, filed Oct. 15, 2004, David R. Alvarez, Systems and Methods for Money Sharing.

(Continued)

*Primary Examiner* — Ojo Oyebisi
(74) *Attorney, Agent, or Firm* — Carr & Ferrell LLP

(57) ABSTRACT

Self-service methods for money remittance and kiosks are provided. An exemplary kiosk includes a video display, a card reader, a keypad, a money validation device, and a processor in communication with a database and a processing system across a network. A person can remit money to a recipient by simply presenting an access card to the card reader, entering a PIN on the keypad, and inserting cash into the money validation device. The database includes information associated with the identifier such as one or more established recipients and necessary information for remitting funds to each. The kiosk can receive a list of established recipients from the database and present the list to the person on the video display. After the person selects a recipient from the list, the kiosk can transmit to the processing system the recipient and the cash amount received by the money validation device.

22 Claims, 12 Drawing Sheets

(56) References Cited

U.S. PATENT DOCUMENTS

| | | |
|---|---|---|
| 5,953,710 A | 9/1999 | Fleming |
| 5,963,647 A | 10/1999 | Downing et al. |
| 6,012,048 A | 1/2000 | Gustin et al. |
| 6,044,360 A | 3/2000 | Picciallo |
| 6,105,009 A | 8/2000 | Cuervo |
| 6,129,275 A | 10/2000 | Urquhart et al. |
| 6,141,438 A | 10/2000 | Blanchester |
| 6,298,336 B1 | 10/2001 | Davis et al. |
| 6,327,573 B1 | 12/2001 | Walker et al. |
| 6,467,684 B2 | 10/2002 | Fite et al. |
| 6,473,500 B1 | 10/2002 | Risafi et al. |
| 6,502,747 B1 * | 1/2003 | Stoutenburg et al. ......... 235/379 |
| 6,573,983 B1 | 6/2003 | Laskowski |
| 6,575,362 B1 | 6/2003 | Bator et al. |
| 6,578,761 B1 | 6/2003 | Spector |
| 6,598,794 B1 | 7/2003 | Ishii |
| 6,609,113 B1 | 8/2003 | O'Leary et al. |
| 6,619,545 B2 | 9/2003 | Harris |
| 6,636,833 B1 | 10/2003 | Flitcroft et al. |
| 6,659,259 B2 | 12/2003 | Knox et al. |
| 6,758,394 B2 | 7/2004 | Maskatiya et al. |
| 6,918,537 B2 | 7/2005 | Graves et al. |
| 6,999,569 B2 | 2/2006 | Risafi et al. |
| 7,257,246 B1 | 8/2007 | Brodie et al. |
| 7,735,125 B1 | 6/2010 | Alvarez et al. |
| 2001/0001856 A1 | 5/2001 | Gould et al. |
| 2001/0011680 A1 | 8/2001 | Soltesz |
| 2001/0013018 A1 | 8/2001 | Awano |
| 2001/0032878 A1 | 10/2001 | Tsiounis et al. |
| 2001/0042784 A1 | 11/2001 | Fite et al. |
| 2001/0054019 A1 | 12/2001 | de Fabrega |
| 2002/0022966 A1 | 2/2002 | Horgan |
| 2002/0029195 A1 | 3/2002 | Russell et al. |
| 2002/0049669 A1 | 4/2002 | Bleser et al. |
| 2002/0061094 A1 | 5/2002 | Walker et al. |
| 2002/0082993 A1 * | 6/2002 | Hoyos et al. .................... 705/43 |
| 2002/0091937 A1 | 7/2002 | Ortiz |
| 2002/0179401 A1 | 12/2002 | Knox et al. |
| 2002/0198806 A1 | 12/2002 | Blagg et al. |
| 2003/0024979 A1 * | 2/2003 | Hansen et al. ................ 235/379 |
| 2003/0046249 A1 | 3/2003 | Wu |
| 2003/0074310 A1 * | 4/2003 | Grovit et al. .................... 705/39 |
| 2003/0080185 A1 | 5/2003 | Werther |
| 2003/0088470 A1 | 5/2003 | Cuervo |
| 2003/0097331 A1 | 5/2003 | Cohen |
| 2003/0105714 A1 | 6/2003 | Alarcon-Luther et al. |
| 2003/0130940 A1 * | 7/2003 | Hansen et al. .................. 705/39 |
| 2003/0144971 A1 * | 7/2003 | Das et al. ...................... 705/401 |
| 2003/0200180 A1 | 10/2003 | Phelan, III et al. |
| 2003/0218062 A1 | 11/2003 | Noriega et al. |
| 2004/0007618 A1 | 1/2004 | Oram et al. |
| 2004/0059953 A1 | 3/2004 | Purnell |
| 2004/0091136 A1 | 5/2004 | Dombrowski |
| 2004/0223629 A1 | 11/2004 | Chang |
| 2005/0021363 A1 | 1/2005 | Stimson et al. |
| 2005/0038737 A1 | 2/2005 | Norris |
| 2005/0082364 A1 | 4/2005 | Alvarez et al. |
| 2005/0086168 A1 | 4/2005 | Alvarez et al. |
| 2005/0091161 A1 | 4/2005 | Gustin et al. |
| 2005/0127169 A1 | 6/2005 | Foss, Jr. |
| 2005/0269415 A1 | 12/2005 | Licciardello et al. |
| 2006/0032911 A1 | 2/2006 | Arias |
| 2006/0037835 A1 | 2/2006 | Doran et al. |
| 2006/0064379 A1 | 3/2006 | Doran et al. |
| 2006/0069642 A1 | 3/2006 | Doran et al. |

OTHER PUBLICATIONS

U.S. Appl. No. 10/966,497, filed Oct. 15, 2004, David R. Alvarez, Systems and Methods for Generating Revenue from Banking Transactions Using a Stored-Value Card.

U.S. Appl. No. 10/966,925, filed Oct. 15, 2004, David R. Alvarez, Systems and Methods for Generating Revenue from Multi-Card Money Sharing.

U.S. Appl. No. 10/966,299, filed Oct. 15, 2004, James Elliot, Systems and Methods for Biometric Identification and Verification of a User of a Kiosk.

U.S. Appl. No. 10/966,879, filed Oct. 15, 2004, David R. Alvarez, Systems and Methods for Banking Transactions Using a Stored-Value Card.

The Value in Stored-Value, Lauri Giesen, BAI Online, Banking Strategies, Jul./Aug. 2003, vol. LXXIX, No. IV.

* cited by examiner

SELF-SERVICE MONEY REMITTANCE WITH AN ACCESS CARD

CROSS-REFERENCE TO RELATED APPLICATIONS

This application is a Continuation-in-Part of U.S. Non-Provisional application Ser. No. 10/966,958 filed on Oct. 15, 2004 U.S. Pat. No. 8,204,829 and titled "Systems and Methods for Money Sharing" which claims the benefit of U.S. Provisional Application Ser. No. 60/512,290, also titled "Systems and Methods for Money Sharing," filed Oct. 17, 2003, both of which are incorporated by reference herein.

BACKGROUND

1. Field of the Invention

The present invention relates generally to financial services, and more particularly to systems and methods for transferring money between individuals in different countries.

2. Description of the Prior Art

Sharing of money among relatives, friends, or business partners has always existed in human society. The methods used for money sharing are affected by both the versatility of the forms of money, the mobility of people, and the manifestations of the need to share. Financial transactions have become increasingly credit-based. These changes have spawned a vast network of credit card companies and banking systems. Unfortunately, global traveling, habitation, and migration of people often put customers in situations where existing credit and banking systems do not offer satisfactory money sharing opportunities in terms of convenience, compatibility and directness.

As the sharing of money has evolved beyond direct mailing of currencies, people have started to use financial institutions such as banks, credit unions, or brokerage houses as "middlemen" to transfer money from one location to another and from one individual to another. In one example, wire transfer is used through an independent brokerage house having branch offices at various locations to transfer money from one location to another. One problem with wire transfer is that it requires both transferor and transferee to have easy access to a branch office of the brokerage house.

Another problem with using such brokerage houses is the amount of time required of the transferor. The transferor must travel to the brokerage house, fill out a form, and then wait in a line for an agent. Additionally, such brokerage houses must charge hefty service fees to cover the overhead of the building and the employees.

Bank cards such as debit cards associated with a traditional bank account could also be used to transfer money from a transferor to a transferee. In one example, a transferor having a traditional bank account may receive two debit cards and give one of the debit cards to a transferee. The transferee may then use the debit card to withdraw money from the transferor's bank account. If the transferor does not want the transferee to have access to the main bank account, the transferor may establish a separate debit account with a debit limit particularly for the purpose of transferring money to the transferee. If enabled to access Automatic Teller Machines (ATMs), debit cards shared in this manner could be used to transfer money to a transferee located in many places in the world.

One problem with debit cards, ATM-enabled or not, is that they require a traditional bank account, such as a demand deposit account (DDA). A bank customer must physically go to a branch of a traditional bank to set up a bank account before he can start to use the ATM-enabled debit cards associated with the bank account. The bank typically checks the customer's identity based on their driver's license or other documentation and collects personal information such as address, date of birth, and Social Security number. Banks need to verify identification to prevent fraud and/or improve security for the customer's banking transactions. In addition, most banks require credit checks and US citizenship, without which banks require large deposits. This results in excluding as much as one third of the people desiring the services. Furthermore, there may be government regulations that require proof of identity before using bank accounts to prevent illegal activities such as money laundering and funding of terrorist activities.

Additionally, funds associated with a debit account and debit cards may not be immediately available for withdrawal. For example, a customer having an existing bank account and associated ATM-enabled debit cards may make direct deposits at an ATM without physically visiting a bank branch. The deposits are often made in cash or a check in a deposit envelope. The deposited amount is not immediately available until a bank employee services the ATM machine to collect and process the deposits. This "float period" typically can be 1-3 days long.

Using credit cards could accomplish similar results for money transfer, but with similar problems. A credit card holder usually needs to have a good credit history to possess a credit line issued for a credit card. In addition, credit cards can take weeks to issue from a bank. Typically, a customer must submit an application for a credit card. The application is subject to approval. If approved, the credit card is then mailed to the person's address. The process often takes days, if not weeks. In addition to the delays, many people may wish to avoid using credit cards to transfer money due to lack of security, privacy, or credit history.

More importantly, money transfer is different from money sharing among two or more people. Money transfer involves a one-way transfer of money in which money is transferred from a transferor to a transferee. Most money transfer methods are also one-time transfers. The transferee usually receives the transferred money in one withdrawal to complete the one-way transfer. If the transferor needs to transfer more money to the transferee on a subsequent occasion, a separate and unrelated money transfer is performed. Even if an account is set up for multiple money transfer transactions, the account does not provide a way for the transferee to give money back to the transferor.

Stored-value cards typically have been used to provide payment for goods or services after a user has deposited money into a stored-value account. For example, stored-value cards have been used as gift cards and as cards that provide payment for coffee or copies. Stored-value cards have both their origin and history related to merchants who sell goods or services. The stored-value cards are used for direct purchasing of the goods or services by the customers from the merchant.

SUMMARY OF THE INVENTION

The invention addresses the above problems by providing systems and methods for money sharing using multiple stored-value cards associated with a stored-value account. A system for money sharing includes a processor and a storage device. The processor receives a deposit amount and assigns an account value to a stored-value account. The processor dispenses the stored-value cards, which are configured to enable a cardholder to access the stored-value account to withdraw at least a part of the account value from the stored-value account. The multiple cards can also be used to deposit additional amounts into the stored-value account. The storage device stores the stored-value account.

In one embodiment, the stored-value cards are enabled to operate on an Automatic Teller Machine (ATM). In some embodiments, the multiple stored-value cards associated with the same stored-value account are identical. In some embodiments, the processor receives and verifies user identification information including a biometric attribute such as fingerprinting information. In some embodiments, a kiosk is configured to receive a deposit amount, assign an account value to a stored-value account, and dispense stored-value cards. In some embodiments, the kiosk is unattended and creates the stored-value account without requiring an account holder to pre-register.

These systems and methods advantageously provide money sharing without requiring a user to possess a traditional bank account. Most banks require credit checks and US citizenship, without which banks require large deposits. This results in excluding as much as one-third of the people desiring financial services. The systems and methods can be used for global or international money sharing among various parties. In some embodiments, stored-value cards issue instantaneously upon submission of a deposit with sufficient identification and verification of the user. In some embodiments, once a monetary amount has been deposited in the stored-value account, the funds may be shared instantaneously with one or more other cardholders worldwide.

The disclosure also provides self-service kiosks and self-service methods for money remittance. An exemplary automated kiosk for money remittance comprises a card reader, a money validation device, and a processor. The processor of the kiosk is configure to obtain from the card reader an identifier read from an access card, obtain from a database information associated with the identifier, receive a cash amount from the money validation device, and transmit to a processing system information pertaining to a money remittance including the cash amount. The information associated with the identifier can include a list of established recipients, for example, and in some of these embodiments the information pertaining to the money remittance further includes a recipient selected from the list of established recipients. Various embodiments of the kiosk can further comprise a telephone receiver, a keypad coupled to the processor, and a receipt printer coupled to the processor.

An exemplary self-service method for initiating an international money remittance consists of providing an access card to a card reader of an automated kiosk, entering a PIN on a keypad of the kiosk, and inserting cash into a money validation device of the kiosk. After a sender initiates the money remittance, the money remittance can be completed by a recipient receiving a monetary amount determined from the cash that was inserted into the money validation device.

Another exemplary self-service method for money remittance comprises providing an access card to a card reader of an automated kiosk located in a first country, and inserting cash into a money validation device of the kiosk, the cash comprising a monetary amount. Here, the access card is associated with stored information in a database necessary to complete a money remittance to a recipient. In some embodiments, the stored information includes information pertaining to a sender and the recipient, and in some of these embodiments the information pertaining to the recipient includes a Clave Bancaria Estandarizada (CLABE) number. The method can further comprise selecting the recipient from a plurality of established recipients on a touch-screen of the kiosk. In various embodiments, the method can further comprise entering a PIN and/or receiving a receipt. The method can also comprise receiving the monetary amount at a financial services office located in a second country, such as an office of an international wire-transfer service or an office of a bank.

The disclosure also provides an exemplary method for money remittance by an automated kiosk including a card reader and a money validation device. The exemplary method comprises reading an identifier from an access card, obtaining from a database information associated with the identifier, receiving cash comprising a sum value into the money validation device of the kiosk, and transmitting to a processing system information pertaining to a money remittance including the sum value. In this method, the information associated with the identifier can include a list of established recipients, and the information pertaining to the money remittance can further include a recipient selected from the list.

Still another exemplary method for money remittance comprises reading an identifier from an access card with a card reader of an automated kiosk, obtaining by the kiosk information associated with the identifier from a database, and receiving cash comprising a sum value with a money validation device of the kiosk. The method further comprises determining by the processing system a monetary amount by subtracting a fee from the sum value, displaying the fee and the monetary amount on a video display of the kiosk, and crediting the monetary amount to a recipient by the processing system. This method can further comprise displaying an exchange rate on the video display of the kiosk in some embodiments.

DETAILED DESCRIPTION OF THE INVENTION

Figure 1:
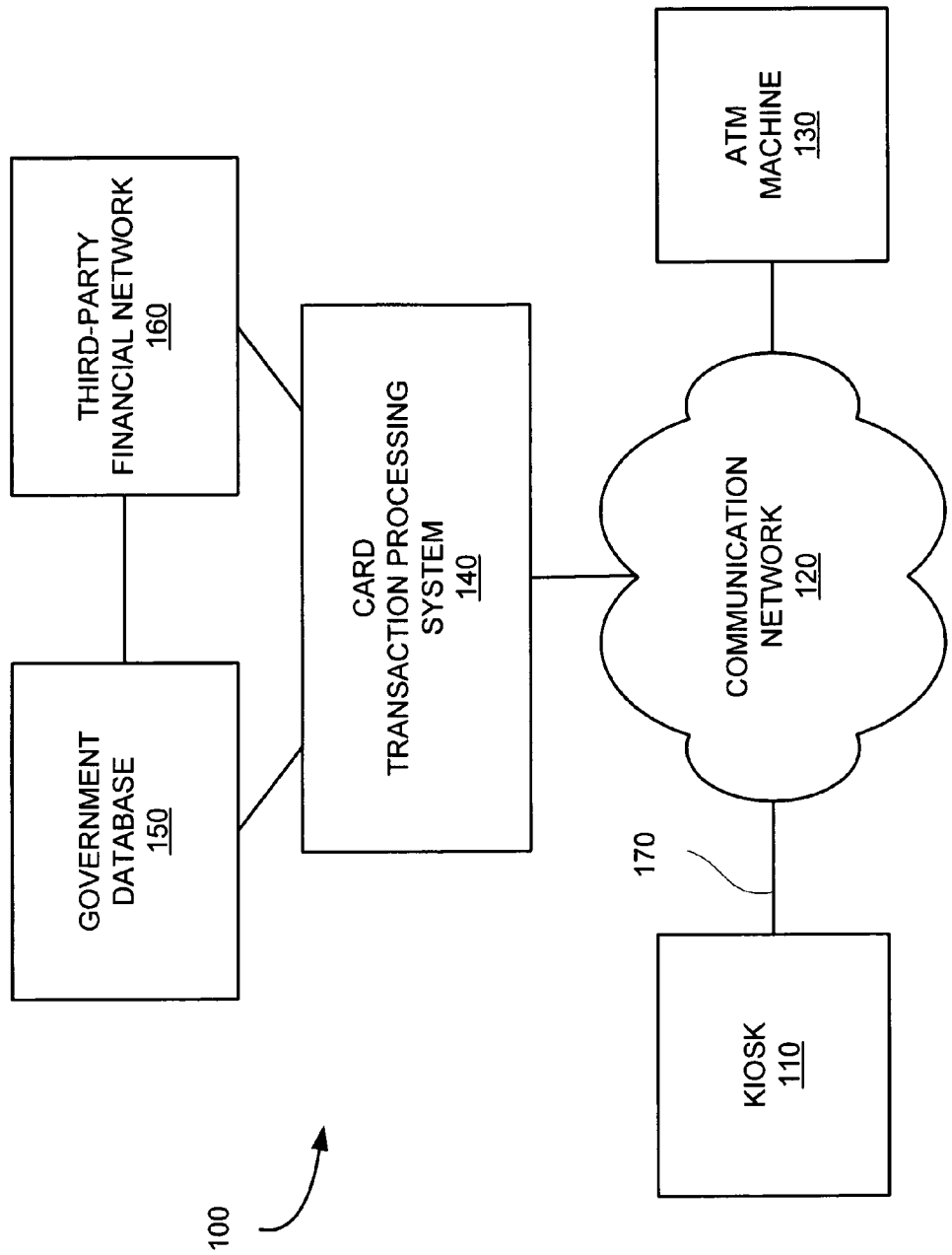
FIG. 1 is a block diagram of a system for money sharing in an exemplary embodiment of the invention.

The present inventions provide systems and methods for money sharing. Those skilled in the art will recognize that various features disclosed in connection with the embodiments may be used either individually or jointly. It is to be appreciated that while the present inventions have been described with reference to preferred implementations, those having ordinary skill in the art will recognize that the present inventions may be beneficially utilized in any number of environments and implementations.

The inventions have been described below with reference to specific embodiments. It will be apparent to those skilled in the art that various modifications may be made and other embodiments can be used without departing from the broader scope of the inventions. Therefore, these and other variations upon the specific embodiments are intended to be covered by the present inventions.

The systems and methods for money sharing use multiple stored-value cards associated with a stored-value account. A user does not need a pre-existing bank account to create a stored-value account for money sharing. Money sharing is a financial process for allowing deposits and/or withdrawals of monetary amount among multiple users. In an example, an initial user receives multiple stored-value cards and provides them to the parties sharing money, including one for the user, himself. In this example, anyone possessing a stored-value card associated with the stored-value account is able to access a remote access unit such as an ATM machine to withdraw funds from the stored-value account and to deposit additional amounts into the stored-value account, again without being required to have a bank account. The remote access unit can be unattended to further enhance accessibility. Further, the funds may be exchanged for goods, services or currency at a point of sale. When implemented in the form of a network, such as one that is compatible with an ATM network, the systems and methods can be used for instantaneous global or international money sharing among various parties with access to kiosks, ATMs, or POS worldwide.

In the present disclosure, a bank account is an account having funds deposited in a bank that are credited to an account holder and is subject to withdrawal. The terms "funds" and "money" are used interchangeably in the present disclosure.

A debit card is defined as a card, typically plastic, that may be used for purchasing goods and services or for obtaining cash advances for which payment is made from existing funds in a related bank account. A debit card provides about the same float as a checking account (1-3 days). These cards are often part of the comprehensive all-in-one accounts offered by many banks.

A stored-value account is monetary value associated with a card that does not require a credit line or a traditional bank account, such as a demand deposit account ("DDA") or brokerage account. A stored-value card is a card associated with a stored-value account. A stored-value account may be issued by an account issuer based on prepaid or otherwise verified funds. In addition, a stored-value account may be used or "spent" by a user in a transaction between the user and the account issuer, while a traditional bank account (e.g., a checking account) is used by a user in a transaction between the user and a third-party merchant from which the user buys goods or services. The issuing bank for a bank account acts as a credit-giving middleman between the user and the merchant. These characteristics make a stored-value account different from a traditional bank account.

The value of a stored-value card is only realized after funds are deposited into the stored-value account associated with the card. One significant difference exists between a stored-value card and a debit card in that a stored-value card is not required to be associated with a DDA account while a debit card is.

In some embodiments, the kiosk receives customer input data that comprises customer account information. In some embodiments, the kiosk receives customer input data that comprises customer account information from a card. In some embodiments, the verification response comprises a customer record and the kiosk processes the verification response by comparing the customer record to the customer input data to verify the identity of the user of the kiosk. In some embodiments, the verification response comprises a verification result and the kiosk determines verification of the identity of the user of the kiosk based on the verification result. In some embodiments, the external verification system receives the identification query from the kiosk, processes the identification query to generate a verification response for identifying the user of the kiosk, and transmits the verification response back to the kiosk.

Remote verification of an identity of a user of a kiosk may provide both transactional authentication and security without the necessity of face-to-face contact or lengthy identity verification through the postal system. Identification is accomplished by capturing customer input data. Customer input data is any information that the kiosk receives that indicates the customer's identity. Some examples of customer input data include customer account information and biometric data. Customer input data is any information that the kiosk receives that indicates the customer's identity. Some examples of customer input data include customer account information and biometric data. Customer account information may include, without limitation, one or any combination of the following: an account number, a name, a date of birth, a place of birth, a local address, a Social Security number, a tax identification number, or a Matricula Consular card number. Biometric data is any information related to the customer's physiological characteristics that indicates the customer's identity. Verification confirms the identity of an individual by comparing the customer input data with previously recorded user data. In an example, identification is accomplished through capturing an image of a fingerprint of an individual.

In an example, verification is accomplished by confirming the identity of the user through matching the customer input data against previously recorded user data such as a customer record. A customer record is at least some customer input data that has been previously collected and is maintained on an external verification system. An external verification system is any system external to the kiosk that, based on an identification query, can verify or assist in verifying the identity of the user of the kiosk. Once the identification query is processed, the external verification system generates a verification response and transmits the verification response to the kiosk. An external verification system may be owned or operated by a private organization, a government organization, or both. An example of an external verification system may include a card transaction processing system, a government database, or a member bank system.

An identification query is any signal, message, or instruction that indicates a request for verification of the identity of the user of the kiosk. The identification query may comprise at least some customer input data and a request for a customer record, or, alternately, at least some customer input data and a request that the external verification system process and provide a direct verification of the user's identity. A verification response is any signal, message, or instruction that indicates a response from an external verification system that indicates an identity of a user of a kiosk.

One example of a government regulation requiring verification is the USA Patriot Act of 2001, through the application of 31 CFR.sctn.103.121, which provides two options for verifying the identity of a customer within specific circumstances: non-documentary verification and documentary verification. Documentary verification is the verification of the identity of a user through documents typically provided by the user including, but not limited to, driver's licenses, state-issued ID cards, military ID cards, Matricula Consular cards, passports and alien registration cards. Non-documentary verification is used when users are unable to satisfy documentary requirements or as an additional verification step. This approach involves comparisons of separately obtained information to that which the user provided. For example, the user's home address can be compared to address(es) appearing on the credit report.

In another example of identification, customer input data may be obtained that includes documents such as a driver's license or Social Security number. A software program that executes a validation algorithm may check the documents to establish the probability of each document's validity. For example, a driver's license from a particular state may require a specific combination of numbers and letters. If the software probability program reviews the customer input data and determines that there are an incorrect combination of numbers and letters, then verification may be denied. If the software probability program determines that all of the customer input data is most likely valid, the customer input data may be directed to the verification process and subsequently checked against a government database.

Identification and remote verification may provide equal, if not better, safeguards than both face-to-face meetings and written verification. In some embodiments, methods such as signature, fingerprint, retina, audio, and image analysis can be far more accurate and less subjective than simple visual recognition of a customer based on a driver's license that may be years old. In some embodiments, documentary verification may be performed by comparing a user's image to a scanned photograph from the user's state-issued ID card. Simultaneously, non-documentary verification may be conducted by comparing the user's account information from their stored-value card to a credit report located within a remote verification system. Remote identification and verification may allow the customer ease of access while providing financial institutions safeguards against fraud and identity theft.

In some embodiments, remote verification may allow financial institutions to meet government regulations by verifying the identity of a customer against government or third-party databases in order to reduce the opportunity for terrorism or money laundering. An example of applicable government regulations that may be satisfied through comparing a user's identity against a government database includes Title III of the USA Patriot Act, entitled "International Money Laundering Abatement and Antiterrorist Financing Act of 2001." Further, in some embodiments, remote verification may also allow financial institutions to reduce fraud and identity theft.

FIG. 1 is a block diagram of a system 100 for money sharing in an exemplary embodiment of the invention. The system 100 for money sharing includes a kiosk 110, a communication network 120, an ATM machine 130, and card transaction processing system 140, a government database 150, and a third-party financial network 160. The kiosk 110 is coupled to the communication network 120 via the communication link 170. The communication network 120 is coupled to the card transaction processing system 140 and the ATM machine 130. The card transaction processing system 140 is coupled to the government database 150 and the third-party financial network 160. The government database 150 is also coupled to the third-party financial network 160.

As will be shown herein, the government database 150 and the third-party financial network 160, as well as some other features in FIG. 1, are optional. The operations of the kiosk 110 will be discussed in greater detail below in FIGS. 2-9. The kiosk 110 is any unattended mechanism, device, or system that is designed for public access and provides users access to accounts or financial services. For the sake of simplicity, only one kiosk 110 and only one ATM machine 130 are shown in FIG. 1. It is readily appreciated that that there may be numerous kiosks and ATM machines attached to the communication network 120. The ATM machine 130 can be any type of a remote access unit that is capable of providing the necessary stored-value account access as described in this disclosure. As will be shown below, the kiosk 110 is configured to be able to create new stored-value accounts while the remote access unit (ATM machine 130 in the exemplary embodiment) is configured to provide a stored-value cardholder the necessary access to an existing stored-value account to withdraw money from the account or add more funds to the account. In one embodiment, the kiosk 110 is also configured to provide a stored-value cardholder necessary access to an existing stored-value account to withdraw money from the account or add more funds to the account. In another embodiment, the remote access unit (ATM machine 130 in the exemplary embodiment) and the kiosk 110 are substantially identical in terms of functionality. In other embodiments, the remote access unit (ATM machine 130) is different from the kiosk 10 in at least one function. For example, the remote access unit (ATM machine 130) may not allow users to create new stored-value accounts as the kiosk 110 does.

The communication network 120 is any conventional communication network configured to transfer data or information related to transactions for card processing and financial transactions. In a simple embodiment, the kiosk 110, the ATM machine 130, and the card transaction processing system 140 are connected through the communication network 120 to form a standalone network financial system which does not require participation of a third-party financial system. However, the system 100 allows participation of third-party financial networks 160 such as member bank systems and bank card association network systems. The system 100 so configured is more adapted to become a part of existing global ATM networks. In some embodiments, the communication network 120 includes a supernetwork configured to manage a couple of sub-networks. Some of these sub-networks handle financial communications for managing transactions, deposits, withdrawals, and balance checks. Additionally, some of these sub-networks handle security communications that verify the card, verify personal ID, and check against government databases.

The card transaction processing system 140 is any system configured to process card transactions and store accounts related to cards. In one embodiment, a company called TSYS operates the card transaction processing system 140. In one embodiment, it may be a call center. The government database 150 is any database that contains government information for individual identification for security and/or law enforcement. Some examples of government information are fingerprints, voice samples, photo identification, Social Security numbers, customer account information, and personal data. In some embodiments, the government database 240 is used to check against known terrorist or other government mandated lists before activating a card or allowing account access. In an embodiment, the government database 150 includes known terrorist or other government mandated lists. In this embodiment, the government database 150 is used to compare against customer identification information before allowing the customer access to accounts and services. In other embodiments, the government database 240, or a third-party database, assures compliance with applicable regulations, and in real time if necessary. Moreover, the government database 150 can be used to notify the government of the time, place, and amount of each transaction, cash deposit and withdrawal, as well as any suspicious activity. In some embodiments, the cash has limited acceptance by time period (e.g. day, week, month, and year) based on information contained in the government database 150. In other embodiments, checking customer identification information against the government database 150 assures compliance with applicable regulations and in real time if necessary. An example of applicable government regulations that may be satisfied through comparing customer identification information against the government database 150 includes Title III of the USA Patriot Act, entitled "International Money Laundering Abatement and Antiterrorist Financing Act of 2001." Reporting suspicious account activity may be required to satisfy government regulations including 31 USC 5318 and the USA Patriot Act of 2001.

Figure 2:
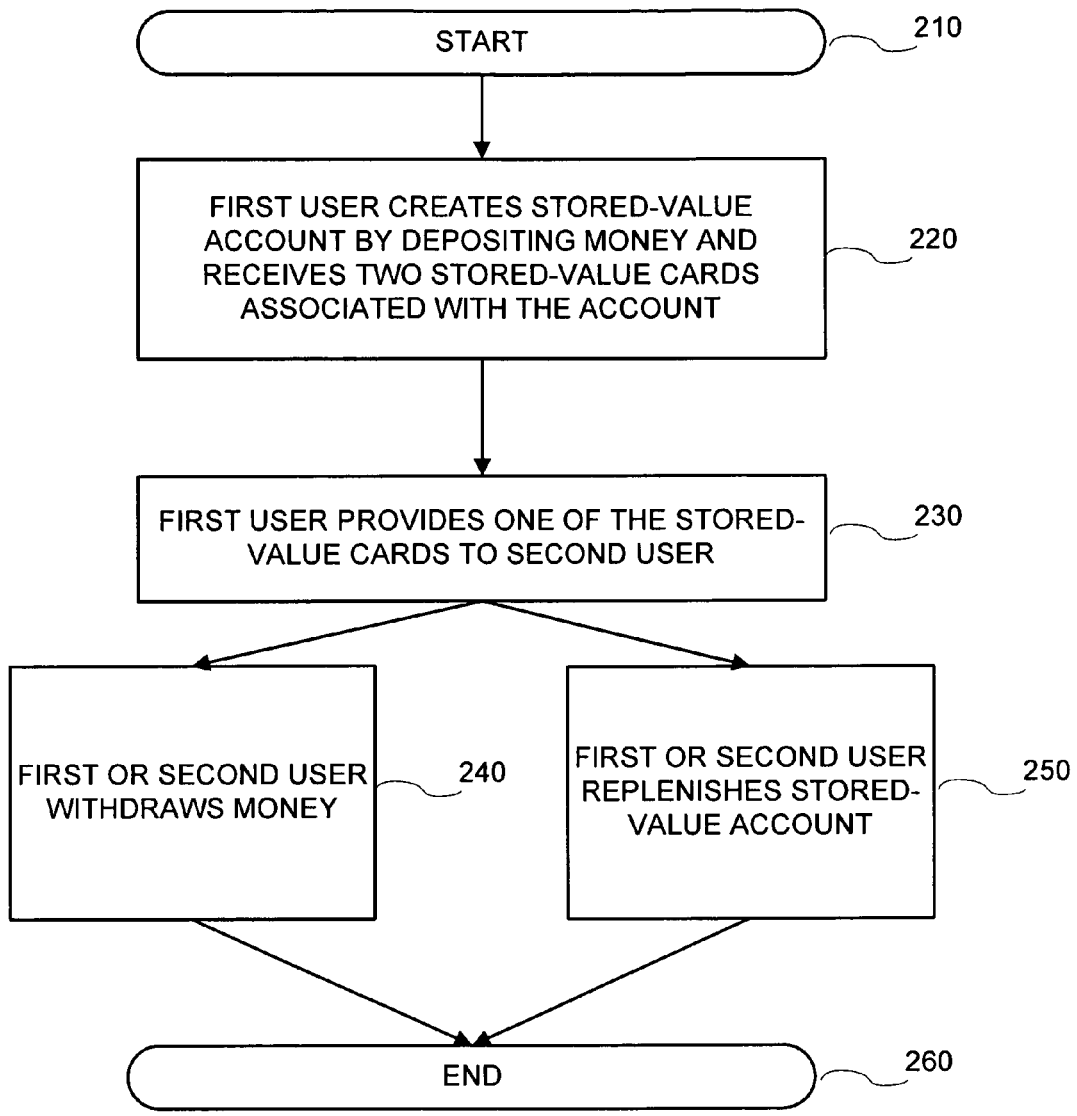
FIG. 2 is a flow chart showing how the system for money sharing is used in an exemplary embodiment of the invention.

FIG. 2 is a flow chart showing how the system for money sharing is used in an exemplary embodiment of the invention. FIG. 2 begins in step 210. In step 220, a first user creates a stored-value account by depositing money and providing personal information (e.g., at kiosk 110 in FIG. 1) and receives two stored-value cards associated with the stored-value account. As will be further illustrated in FIGS. 5-9, creating the stored-value account does not require an existing bank account. For example, once the kiosk 110 receives a cash deposit and user information, the kiosk may immediately allow the creation of a new stored-value account. Subsequently, the funds stored within the stored-value account become immediately available. In another example, a cashier or retailer may receive money and personal information. The cashier or retailer may then give the user one or more stored-value cards.

As will be described herein, money can be deposited in a variety of ways of monetary input. It is noted that even if the monetary input is made using a check or credit card (thus requiring the communication network 120 to be linked to a bank or a credit card company for the purpose of verifying the monetary input), the new account created in FIG. 2 itself may still be a stored-value account instead of a regular bank account, a debit account, or a credit account. Being a stored-value account, the new account created is further not required to be linked to a DDA account, a debit account, or a credit account.

Next, as indicated in step 230, the user provides one of the stored-value cards (a sister card) to a second user, who is an intended party for money sharing, such as a family member or business partner. The user may choose any available method of delivery, including regular airmail, to send the stored-value cards to the second user. As a result, both the first user and the second user are in possession of a stored-value card associated with the same stored-value account. As indicated in step 240, either the first user or the second user may withdraw money using the stored-value card in his possession. In an example, the first or the second user may withdraw money from an access unit. In another example, upon production of the stored-value card, the first or second user may withdraw money from a stored-value account through a retailer. As indicated in independent step 250, either the first user or the second user may deposit more money to replenish the stored-value account. In an example, the first or the second user may deposit more money at an access unit. In another example, upon production of the stored-value card, the first or second user may deposit money into a stored-value account through a retailer. In another example, access units that may be used for these purposes (withdrawal or deposit) include the ATM machine 130 shown in FIG. 1, the kiosk 110, or a different kiosk that is similar to the kiosk 110. Money is thus shared between the first user and the second user. Additional individuals may become a party sharing money if more stored-value cards associated with the same stored-value account are distributed. FIG. 2 ends in step 260.

The present invention therefore permits convenient money sharing between different users at different locations without requiring an existing bank account.

The money sharing system and method shown in FIGS. 1-2 may use a single stored-value account. In other embodiments, the money sharing may involve multiple related stored-value accounts or at least one stored-value account and other types of related accounts.

Figure 3:
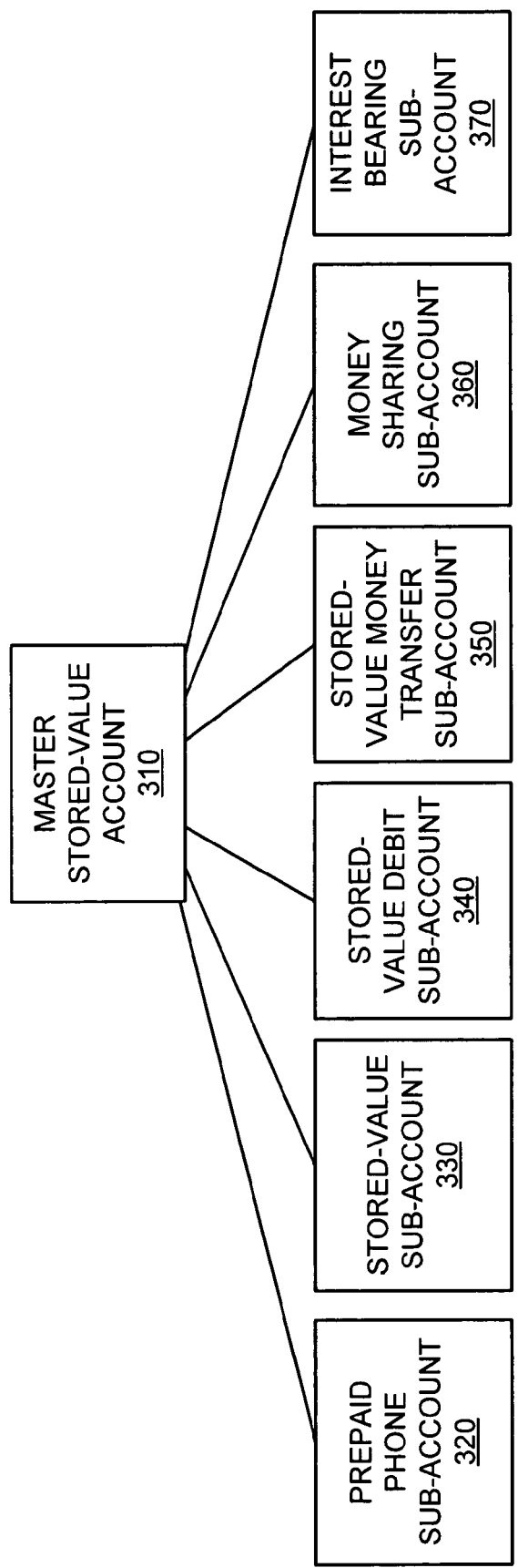
FIG. 3 is a block diagram of a master stored-value account and sub-accounts in an exemplary embodiment of the invention.

FIG. 3 is a block diagram of a master stored-value account and sub-accounts including at least one stored-value sub-account in an exemplary embodiment of the invention. In one embodiment, a master stored-value account 310 is associated with a prepaid phone sub-account 320, a stored-value sub-account 330, a stored-value debit sub-account 340, a stored-value money transfer sub-account 350, a money sharing sub-account 360, and an interest bearing sub-account 370. In other embodiments, the sub-accounts may be for utility bills, school tuition, gift cards, groceries, and other miscellaneous stored-value card programs. In one embodiment, the master stored-value account 310 is a signature- and PIN-based stored-value account.

The master stored-value account 310 can be used to control the sub-accounts 320, 330, 340, 350, 360 and 370, while the money sharing sub-account 360 can be used for money sharing. Specifically, multiple cards may be issued in association with the money sharing sub-account 360 to access the money sharing sub-account 360 through a kiosk (e.g., the kiosk 110) or an ATM machine (e.g., the ATM machine 130) to either withdraw or reload the money sharing sub-account 360. In one embodiment, the multiple cards include a master stored-value card to access both the master stored-value account 310 and the money sharing sub-account 360, and a child stored-value card to access the money sharing sub-account 360 only but not the master stored-value account 310. In another embodiment, the multiple cards include two identical stored-value cards both enabled to access the money sharing sub-account 360 but not the master stored-value account 310. In either embodiment, the cards may be PIN-required ATM-enabled stored-value cards.

In some embodiments, the master stored-value account 310 may be reloaded with funds and used anywhere in the world that a credit/debit card network (such as Visa/Mastercard) is accepted. In some embodiments, the master stored-value account 310 includes phone card capability, the capability to issue money orders or drafts, and the ability to move money into a money-sharing sub-account. The master stored-value account 310 allows movement of some or all of the funds present on the master stored-value account 310 into money sharing sub-accounts which can be either general purpose sub-accounts or restricted use sub-accounts (e.g., for use only at a campus bookstore). These funds can be accessed by taking a cash advance from the master stored-value account 310 at ATMs and banks worldwide, or by using the specially designed money-sharing sister card to affect the cash advance at ATMs globally.

Alternatively, the master stored-value account 310 may be replaced by a bank account or a credit account associated with a bank or a credit card company, while at least one of the sub-accounts, such as the money sharing sub-account 360, is a stored-value account.

Figure 4:
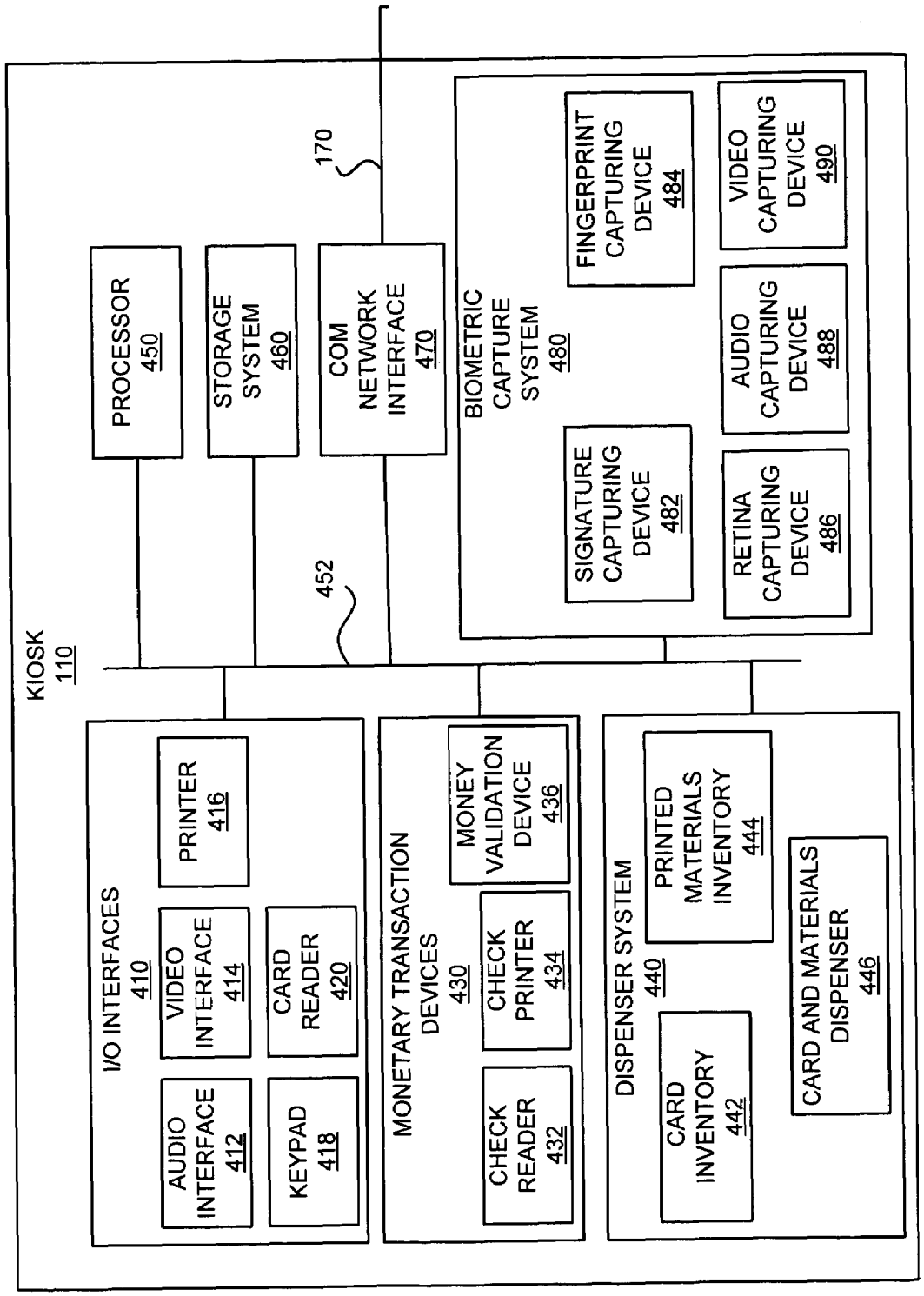
FIG. 4 is a block diagram of a kiosk in an exemplary embodiment of the invention.

FIG. 4 is a block diagram of the kiosk 110 in an exemplary embodiment of the invention. The overall operation of the kiosk 110 will be discussed below in FIGS. 5-9. The kiosk 110 includes input/output (I/O) interfaces 410, monetary transaction devices 430, a dispenser system 440, a processor 450, a bus 452, a storage system 460, a communication network interface 470, a communication link 170, and a biometric capture system 480.

The bus 452 is coupled to the I/O interfaces 410, the monetary transaction devices 430, the dispenser system 440, the processor 450, the storage system 460, the communication network interface 470, and the biometric capture system 480. The communication link 170 is coupled to the communication network interface 470.

The I/O interfaces 410 are any interfaces or devices configured to provide input or output to a user of the kiosk 110. In one embodiment, the I/O interfaces 410 include an audio interface 412, a video interface 414, a printer 416, a keypad 418, and a card reader 420. The audio interface 412 is any device or system configured to audibly communicate between the user and the kiosk 110. Some examples of an audio interface 412 are speakers and a microphone. The video interface 414 is any device or system configured to visually communicate between the user and the kiosk 110. One example of the video interface 414 is a touch-screen display. The printer 416 is a printer configured to print transaction records. The keypad 418 is a standard numeric or alphanumeric keypad. The card reader 420 is a conventional card reader configured to read ATM cards, stored-value cards, debit cards, credit cards, and/or identification cards. In other embodiments, the card reader 420 may be a reader that optically, magnetically, or electrically scans cards, where electrical scanning includes radio-frequency identification (RFID) reading.

The monetary transaction devices 430 are any mechanisms, devices, or systems configured to receive or provide monetary instruments such as checks, drafts, money orders, and currency. In one embodiment, the monetary transaction devices 430 include a check reader 432, a check printer 434, and a money validation device 436. The check reader 432 is a reader configured to read and validate checks. The check printer 434 is a printer configured to print financial instruments such as checks, drafts, or money orders. The money validation device 436 is a conventional device configured to accept and validate currency such as bills and coins so that the deposited funds can be immediately available for withdrawal elsewhere without requiring a line of credit. In other embodiments, the monetary transaction devices 430 include a money order, check, and draft printer which are not shown in FIG. 3. Other embodiments not shown in FIG. 3, may include a money order, check, and draft reader.

The dispenser system 440 is any device or system configured to dispense cards or printed materials related to financial services. In one embodiment, the dispenser system 440 includes a card inventory 442, a printed materials inventory 444, and a card and materials dispenser 446. The printed materials inventory 444 may include printed materials such as user guides or statement information required by government regulations.

The processor 450 is configured to execute software or instructions in accord with the operations discussed below. The storage system 460 is any storage device, memory, or group of storage devices configured to store data permanently or temporarily. The communication network interface 470 is any communication interface configured to transfer data between any components connected to the bus 452 and any communication network.

The biometric capture system 480 is any mechanism, device, or system configured to capture biometric information from a user of the kiosk 110. Biometric information is any information or data that includes at least one biometric attribute that represents a biological or physical feature of a person. Some examples of biometric information are fingerprints, retina scans, audio images, signatures, and video images.

In one embodiment, the kiosk 110 is unattended. Also, in some embodiments, the user may send an e-mail through the kiosk 110, and the kiosk 110 may display a reply e-mail for customer services purposes.

Figure 5:
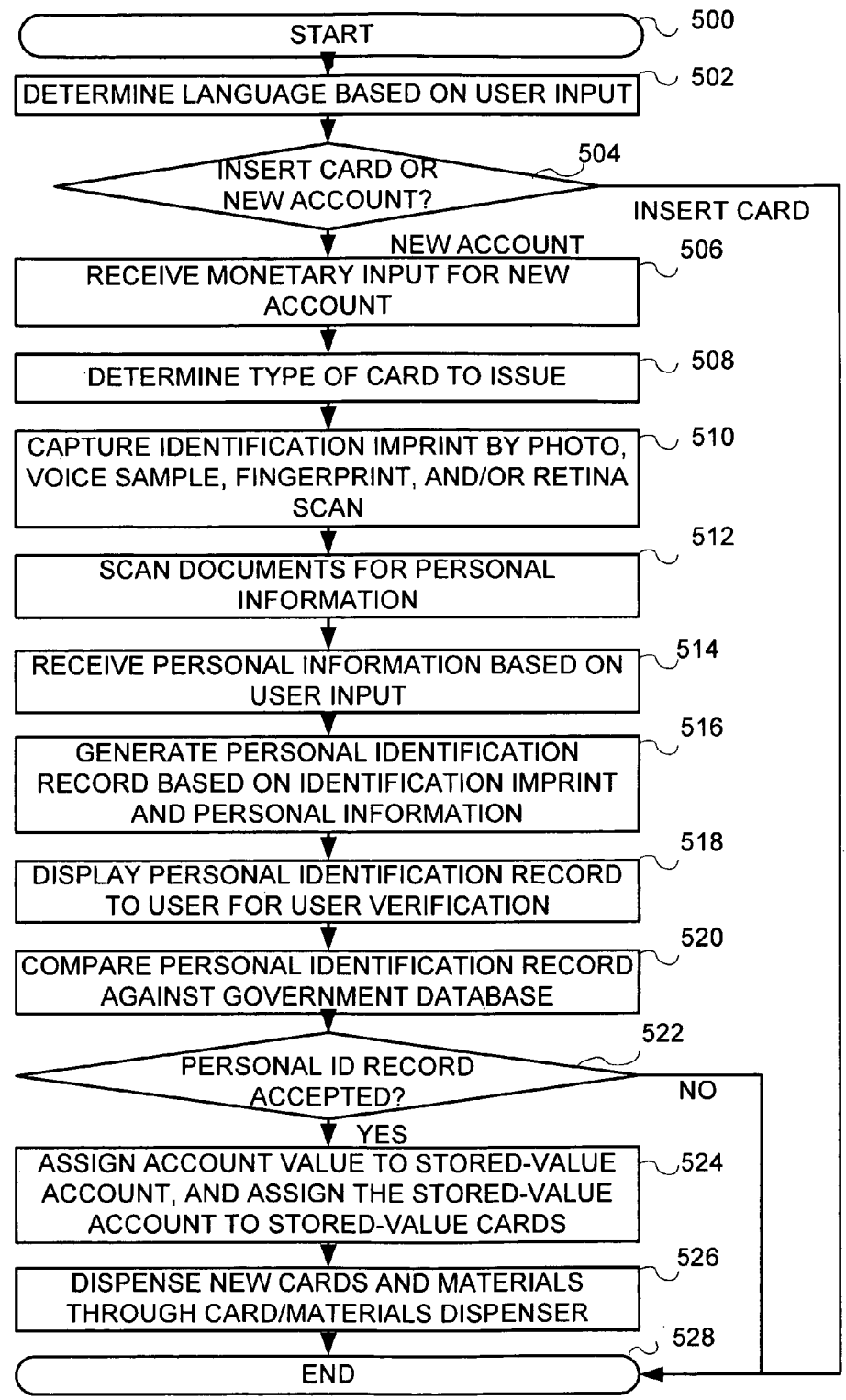
FIG. 5 is a flow chart for creating a new stored-value account and dispensing new stored-value cards in an exemplary embodiment of the invention.

FIG. 5 is a flow chart for creating a new stored-value account and for dispensing new stored-value cards in an exemplary embodiment of the invention. FIG. 5 begins in step 500. In step 502, the kiosk 110 displays an interactive message for the user to determine the preferred language of the user. In step 504, the processor 450 in kiosk 110 checks if a stored-value card was inserted or a new stored-value account was requested by the user. If a stored-value card was inserted, the process for dispensing a new stored-value card ends in step 528. At this point, the kiosk 110 may enter into a different process as shown in, for example, FIG. 6 below.

If a new stored-value account was requested, the kiosk 110 receives a monetary input from the user in step 506. The monetary input constitutes a deposit amount (payment) paid into the new account. Monetary input may include, but is not limited to, cash, check, draft, travelers check, money order, charge, debit, credit card or stored-value card payments. The kiosk 110 may receive the monetary input through either the check reader 432, the money validation device 436, or any other device in the monetary transaction devices 430 that accepts a deposit amount.

In step 508, the processor 450 determines the type of card to issue. In some embodiments, there may be different types of stored-value cards to issue. In step 510, the biometric capture system 480 captures biometric data by photo, voice sample, fingerprint, and/or retina scan of the user of the kiosk 110. The process of capturing the biometric data of a user of the kiosk 110 is described in further detail in U.S. application Ser. No. 10/966,299 entitled "Systems and Methods for Biometric Identification and Verification of a User of a Kiosk" filed on Oct. 15, 2004, which is hereby incorporated by reference.

Remote verification of an identity of a user of a kiosk may provide both transactional authentication and security without the necessity of face-to-face contact or lengthy identity verification through the postal system. Identification is accomplished by capturing customer input data. Customer input data is any information that the kiosk receives that indicates the customer's identity. Some examples of customer input data include customer account information and biometric data. Customer input data is any information that the kiosk receives that indicates the customer's identity. Some examples of customer input data include customer account information and biometric data. Customer account information may include, without limitation, one or any combination of the following: an account number, a name, a date of birth, a place of birth, a local address, a Social Security number, a tax identification number, or a Matricula Consular card number. Biometric data is any information related to the customer's physiological characteristics that indicates the customer's identity. Verification confirms the identity of an individual by comparing the customer input data with previously recorded user data. In an example, identification is accomplished through capturing an image of a fingerprint of an individual.

In an example, verification is accomplished by confirming the identity of the user through matching the customer input data against previously recorded user data such as a customer record. A customer record is at least some customer input data that has been previously collected and is maintained on an external verification system. An external verification system is any system external to the kiosk that, based on an identification query, can verify or assist in verifying the identity of the user of the kiosk. Once the identification query is processed, the external verification system generates a verification response and transmits the verification response to the kiosk. An external verification system may be owned or operated by a private organization, a government organization, or both. An example of an external verification system may include a card transaction processing system, a government database, or a member bank system.

An identification query is any signal, message, or instruction that indicates a request for verification of the identity of the user of the kiosk. The identification query may comprise at least some customer input data and a request for a customer record, or, alternately, at least some customer input data and a request that the external verification system process and provide a direct verification of the user's identity. A verification response is any signal, message, or instruction that indicates a response from an external verification system that indicates an identity of a user of a kiosk.

One example of a government regulation requiring verification is the USA Patriot Act of 2001, through the application of 31 CFR §103.121, which provides two options for verifying the identity of a customer within specific circumstances: non-documentary verification and documentary verification. Documentary verification is the verification of the identity of a user through documents typically provided by the user including, but not limited to, driver's licenses, state-issued ID cards, military ID cards, Matricula Consular cards, passports and alien registration cards. Non-documentary verification is used when users are unable to satisfy documentary requirements or as an additional verification step. This approach involves comparisons of separately obtained information to that which the user provided. For example, the user's home address can be compared to address(es) appearing on the credit report.

In another example of identification, customer input data may be obtained that includes documents such as a driver's license or Social Security number. A software program that executes a validation algorithm may check the documents to establish the probability of each document's validity. For example, a driver's license from a particular state may require a specific combination of numbers and letters. If the software probability program reviews the customer input data and determines that there are an incorrect combination of numbers and letters, then verification may be denied. If the software probability program determines that all of the customer input data is most likely valid, the customer input data may be directed to the verification process and subsequently checked against a government database.

Identification and remote verification may provide equal, if not better, safeguards than both face-to-face meetings and written verification. In some embodiments, methods such as signature, fingerprint, retina, audio, and image analysis can be far more accurate and less subjective than simple visual recognition of a customer based on a driver's license that may be years old. In some embodiments, documentary verification may be performed by comparing a user's image to a scanned photograph from the user's state-issued ID card. Simultaneously, non-documentary verification may be conducted by comparing the user's account information from their stored-value card to a credit report located within a remote verification system. Remote identification and verification may allow the customer ease of access while providing financial institutions safeguards against fraud and identity theft.

In some embodiments, remote verification may allow financial institutions to meet government regulations by verifying the identity of a customer against government or third-party databases in order to reduce the opportunity for terrorism or money laundering. An example of applicable government regulations that may be satisfied through comparing a user's identity against a government database includes Title III of the USA Patriot Act, entitled "International Money Laundering Abatement and Antiterrorist Financing Act of 2001." Further, in some embodiments, remote verification may also allow financial institutions to reduce fraud and identity theft.

In step 512, the kiosk 110 scans documents for personal information. In some embodiments, the kiosk 110 scans the documents for personal information through the card reader 420. Some examples of documents that can be scanned are Matricula Consular cards and driver's licenses. In step 514, the kiosk 110 receives personal information based on user input. The kiosk 110 may receive personal information from the audio interface 412, the video interface 414, the keypad 418, the card reader 420, or the biometric capture system 480. Alternative embodiments may use any one or a combination of steps 510, 512 and 514 to capture identification and personal information.

In step 516, the processor 450 then generates a personal identification record based on the identification imprint and the personal information. In one embodiment, the personal identification record includes name, local address, place and date of birth, digital photo, digital fingerprint, digital voice print, digital photo of ID e.g. driver's license, Social Security number, tax ID number, Matricula Consular card number, and any other data sufficient to meet governmentally mandated standards for customer identification and verification.

In step 518, the kiosk 110 displays the personal identification record using the video interface 414 or the audio interface 412 for user verification. In step 520, the processor 450 compares the personal identification record to the government database 150. In other embodiments, the card transaction processing system 140 or the third-party financial network 160 compares the personal identification record against the government database 150. The comparison process is described in further detail in U.S. Pat. No. 7,735,125, entitled "Systems and Methods for Identifying and Verifying a User of a Kiosk Using an External Verification System" filed on Oct. 15, 2004, which is hereby incorporated by reference.

In step 522, the processor 450 checks whether the personal identification record is accepted. If the personal identification record is not accepted, the process ends in step 528. If the personal identification record is accepted by the government database, the processor 450 assigns a stored-value account to the stored-value cards in step 524. By doing so, the stored-value cards are associated with the stored-value account and enabled to provide a cardholder subsequent access to the stored-value account. In step 524, an account value indicating the total stored-value amount available in the stored-value account is also assigned to the stored-value account. The account value for the stored-value account is determined based on the value of the funds deposited by the user. In a simple embodiment, the account value is the same as the total value of the funds deposited by the user to create the new stored-value account. In other embodiments, a service fee may be deducted from the total value of the funds deposited and the resultant net value is assigned as the account value to the stored-value account. The process of charging a service fee is described in further detail in U.S. application Ser. No. 10/966,925 entitled "Systems and Methods for Generating Revenue from Multi-Card Money Sharing" filed on Oct. 15, 2004, which is hereby incorporated by reference.

Various methods may be used to associate the stored-value cards with the stored-value account. In one embodiment, the stored-value account has an account number. The stored-value account is associated with the stored-value cards by storing the account number of the stored-value account into memory elements of the stored-value cards. The stored-value cards that have the same stored-value account number stored in their memory elements are thus associated with the same stored-value account. In another embodiment, each stored-value card has its own card identification number which may be created and stored or printed on the card before the card has been placed in the card inventory 442 in the kiosk 110. The card identification numbers are linked to the stored-value account by software. The linking can be performed by a central processing system such as the card transaction processing system 140.

The stored-value account having an account value is thus created without requiring a pre-existing bank account. Furthermore, in some embodiments, the user is not required to pre register in order to be associated with or assigned to a particular stored-value account. Instead, the stored-value account is assigned to the user during the same account creation process shown in FIG. 5.

In step 526, the kiosk 110 dispenses the new stored-value cards, card voucher, and/or printed materials through the dispenser system 440. In one embodiment, the printed materials comprise regulatory statements, marketing material, and an instruction booklet. FIG. 5 ends in step 528.

In one embodiment, the kiosk 110 dispenses two stored-value cards that are associated with the same stored-value account. The two stored-value cards can be interchangeable in terms of functionality. For example, the two stored-value cards may both provide access to the same stored-value account to withdraw money from the stored-value account or deposit additional amounts into the stored-value account. Functionally interchangeable stored-value cards may even be physically identical except for appearances such as colors. However, it is appreciated that functionally interchangeable cards are not required to be physically identical. For example, the two stored-value cards may have different serial numbers but still be functionally interchangeable when both serial numbers are linked to the same stored-value account.

The stored-value cards are preferably ATM-enabled so that they can be operated on ATM machines. ATM-enabled cards typically have a magnetic stripe that contains a memory element in which account information such as account number and user name may be stored. Alternatively or additionally, ATM-enabled cards may have serial numbers pre-printed on the cards. ATM-enabled cards may also be so-called smart cards which have a built-in chip. The chip may be reconfigurable.

At any time after a user has purchased his/her cards, the user may send one or more of those cards to another person, who is located anywhere in the world. The user may also keep one card for himself if the user intends to be a party to share money. Any holder of any of the stored-value cards who also knows the Personal Identification Number (PIN) associated with the cards, may access the funds stored in the stored-value account at any participating remote access unit (e.g., the ATM machine 130).

The stored-value account may be created either prior to or after receiving the deposit amount. The pre-created stored-value account may be further pre-linked to the stored-value cards. In the case where the stored-value account is created after receiving the deposit amount, the account is associated with or linked to the stored-value cards after the account has been created. However, in either case, the stored-value account does not have an assigned account value until the proper funds or payments have been received.

The account information of the stored-value account, including the assigned account value, is stored in a storage device for subsequent access. For better network access to the stored-value account, the stored-value account is desirably stored in a centralized storage (e.g., the card transaction processing system 140) that is separate from the individual kiosk 110 and readily accessible through the communication network 120 from other kiosks or remote access units (e.g., the ATM machine 130). However, the account information may be stored in the storage system 460 in the kiosk 110. Alternatively or additionally, the account information may be stored in the stored-value cards associated with the stored-value account.

In another embodiment, only one stored-value card is dispensed in association with the stored-value account in the process shown in FIG. 5. In this embodiment, another stored-value card associated with the same stored-value account is dispensed either in a previous process or a subsequent process. The two stored-value cards, though dispensed at different times in different processes, together still provide money sharing. For example, the same user may have already received a stored-value card in association with another account (e.g., a master account) and the card is then further associated with the new stored-value account during the process shown in FIG. 5. Such association may be accomplished either by a user choice or automatically based on user identification. Alternatively, the user may elect to have only one stored-value card dispensed at the time when the stored-value account is created in the process shown in FIG. 5 and add a second stored-value card in association with the same stored-value account on a subsequent occasion in order to facilitate multi-card money sharing.

Figure 6:
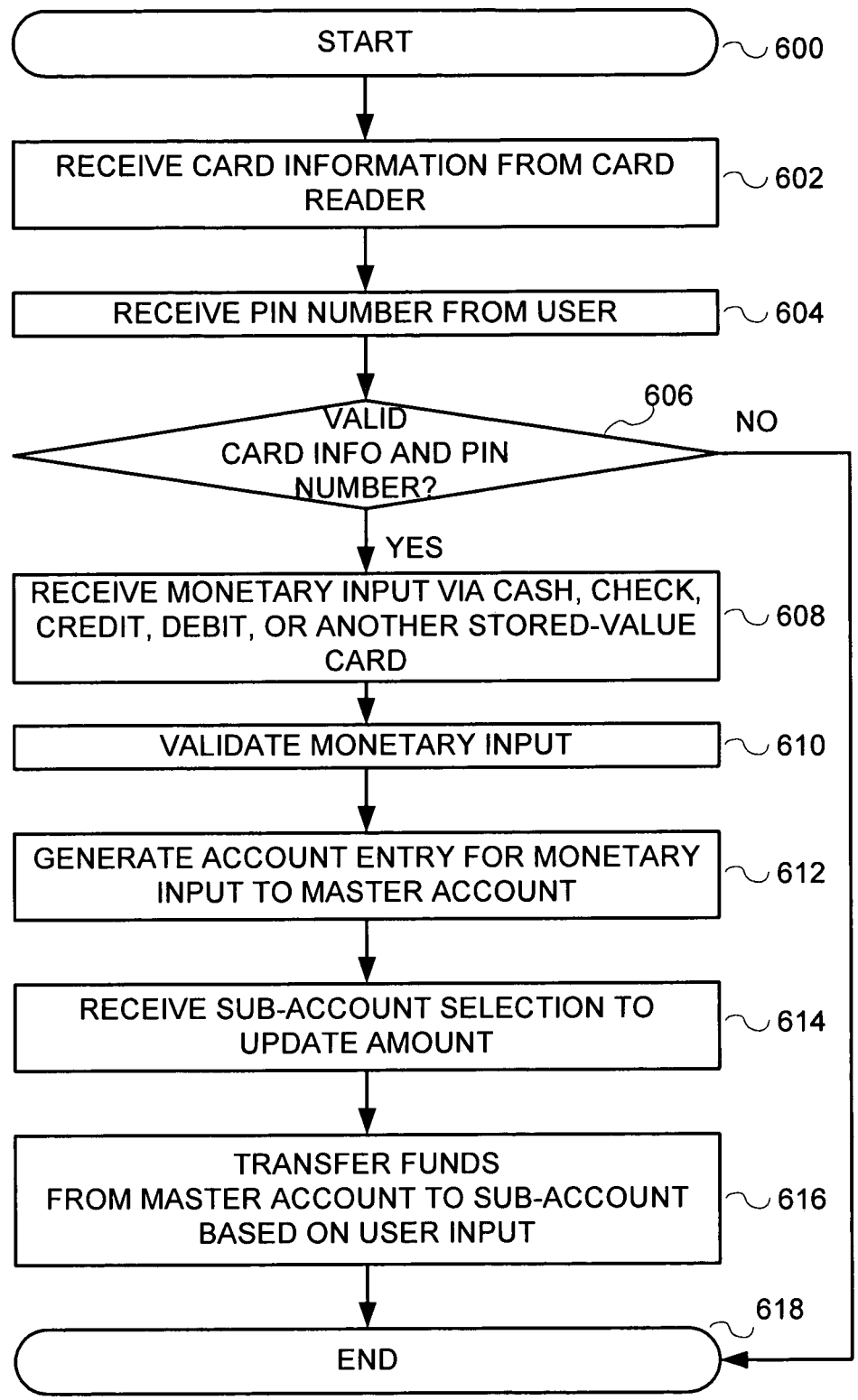
FIG. 6 is a flow chart of a kiosk for sharing value with a sub-account in an exemplary embodiment of the invention.

FIG. 6 is a flow chart of a kiosk for sharing value with a stored-value sub-account in an exemplary embodiment of the invention. FIG. 6 begins in step 600. In step 602, the kiosk 110 receives card information from the card reader 420. In step 604, the kiosk 110 then receives the PIN number from the user through the keypad 418. In step 606, the kiosk 110 checks for valid card information and a valid PIN number. If there is either an invalid card information or invalid PIN number, the process ends in step 618. If there are valid card information and PIN number, the kiosk 110 receives monetary input (deposit amount) via cash, check, draft, credit, debit, or another stored-value card. In step 610, the kiosk 110 validates the monetary input. In step 612, the processor 450 generates an account entry for the monetary input to the master account. In other embodiments, a centralized processor such as the card transaction processing system 140 or the third-party financial network 160, rather than the local processor 450 in the kiosk 110, generates the account entry for the monetary input to the master account. In step 614, the kiosk 110 receives a sub-account selection based on user input to update the amount. In step 616, the kiosk 110 then transfers the funds from the master account to the sub-account based on the user input. In another embodiment, the user may call a call center where the card transaction processing system 140 may transfer funds from the user's master account to different sub-accounts. FIG. 6 ends in step 618.

Figure 7:
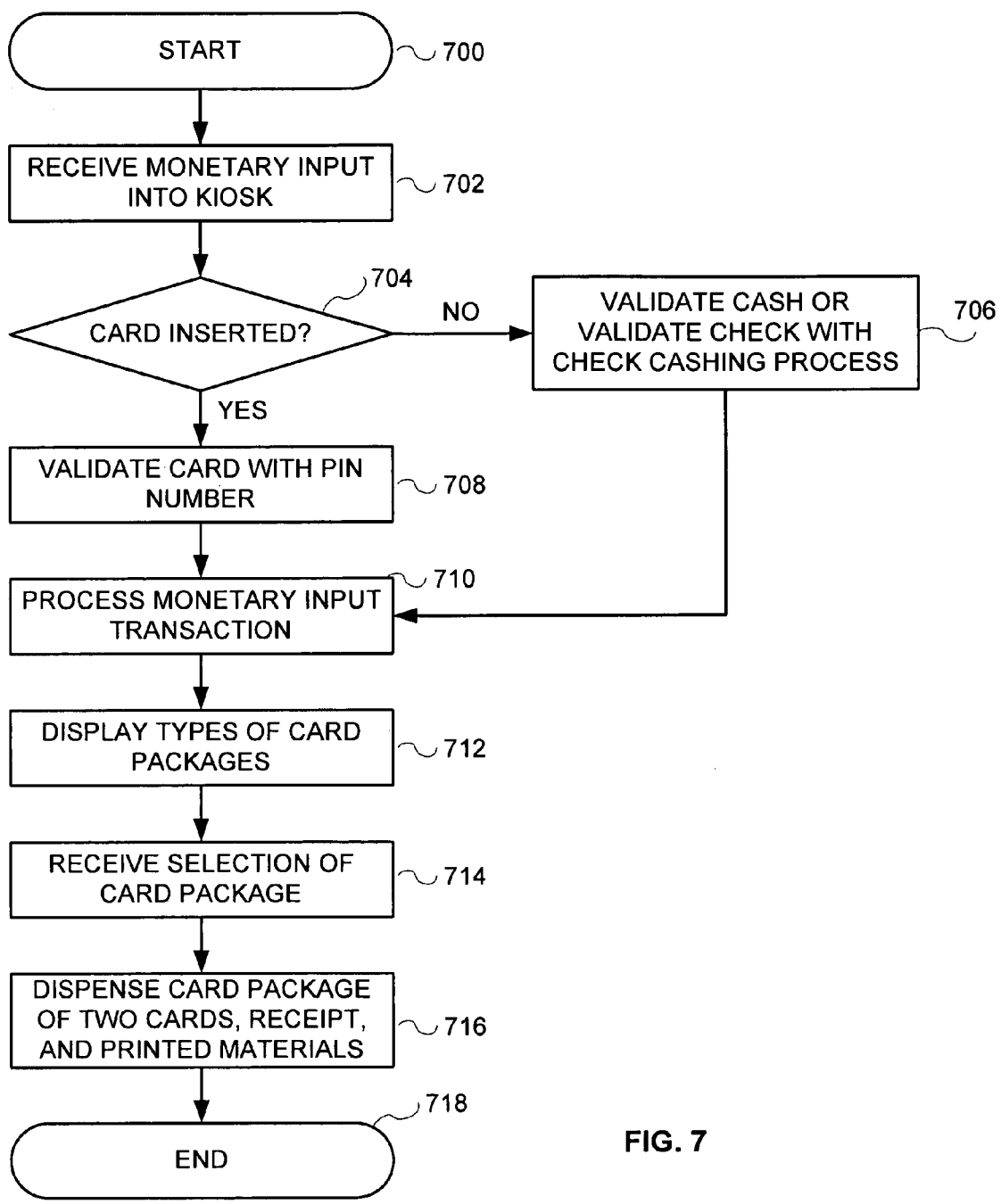
FIG. 7 is a flow chart of the kiosk for dispensing a card package in an exemplary embodiment of the invention.

FIG. 7 is a flow chart of a kiosk for dispensing a card package in an exemplary embodiment of the invention. The process shown in FIG. 7 works for a user with or without an existing stored-value account, and allows the user to select from various card packages which includes an option of a stored-value card package. FIG. 7 begins in step 700. In step 702, the kiosk 110 receives a monetary input by the user. The monetary input constitutes a deposit amount (payment) paid into the stored-value account. Monetary input may include, but is not limited to, cash, check, draft, travelers check, money order, charge, debit, credit card or stored-value card payments. In step 704, the kiosk 110 checks whether a card was inserted. If not, the kiosk 110 validates the cash or the check with a check cashing process in step 706 before proceeding to step 710. If a card was inserted, the kiosk 110 validates the card with a PIN number in step 708. In step 710, the kiosk 110 processes the monetary input transaction to determine the deposit amount.

In step 712, the kiosk 110 displays types of card packages. In step 714, the kiosk 110 receives a selection for a type of card package. In step 716, the kiosk 110 dispenses a card package with receipt, and printed materials. In one embodiment, the card package includes two stored-value cards. These two cards can further be ATM-enabled stored-value cards. In some embodiments, the cards include a magnetic stripe and/or a chip and PIN. In one embodiment, the printed materials comprise regulatory statements, marketing material, and an instruction booklet. FIG. 7 ends in step 718.

Figure 8:
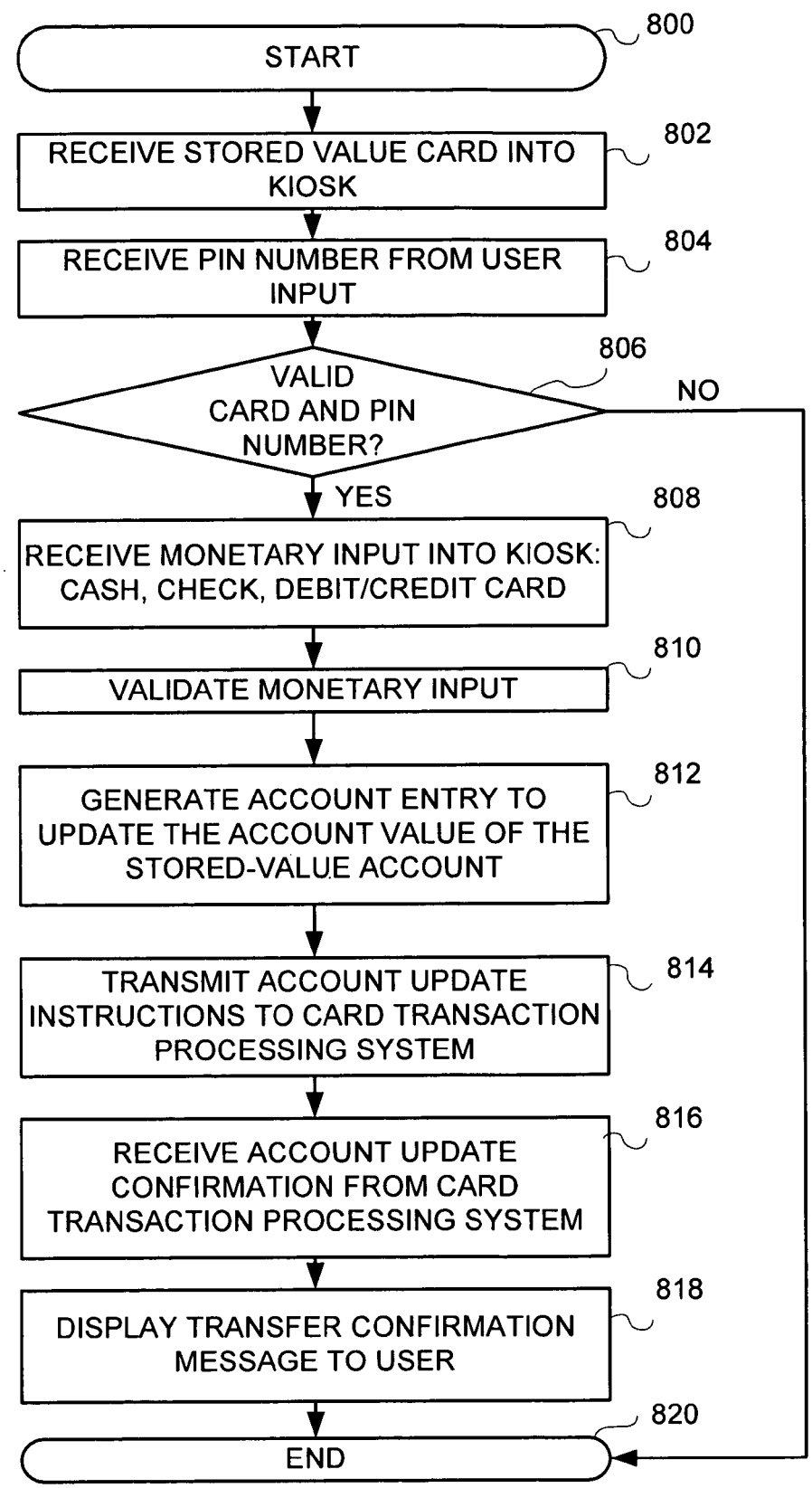
FIG. 8 is a flow chart of the kiosk for charging up an existing stored-value account in an exemplary embodiment of the invention.

FIG. 8 is a flow chart of the kiosk 110 for charging up an existing stored-value account in an exemplary embodiment of the invention. FIG. 8 begins in step 800. In step 802, the kiosk 110 receives a stored-value card. In step 804, the kiosk 110 receives a PIN number from the user via the keypad 418. In step 806, the kiosk 110 checks whether the stored-value card and PIN number are valid. If either the stored-value card or PIN number is invalid, the process ends in step 820. If the stored-value card and PIN are valid, the kiosk 110 receives a monetary input in step 808. Monetary input may include, but is not limited to, cash, check, draft, travelers check, money order, charge, debit, credit card or stored-value card payments. The monetary input constitutes a deposit amount paid into the stored-value account. In step 810, the kiosk 110 validates the deposit amount.

In step 812, the kiosk 110 generates an account entry to update the account value of the stored-value account. In a simple embodiment, the existing account value of the stored-value account is increased by the deposit amount (total value of the funds received) and validated in steps 808 and 810. In other embodiments, a service fee may be deducted from the deposit amount. In other embodiments, a check clearing waiting period may need to be imposed before the new funds can be accessed. In step 814, the kiosk 110 transmits the account update instructions to the card transaction processing system 140 via the communication network interface 470. The kiosk 110 then receives a transfer confirmation message from the card transaction processing system 140 in step 816. In step 818, the kiosk 110 displays a message indicating the account update is confirmed as well as any applicable fund "hold" periods. FIG. 8 ends in step 820.

Slight modifications may be made in steps 812-818 to add funds to a stored-value sub-account. The funds may be either added directly to the stored-value sub-account or added to a master account first and then transferred to the stored-value sub-account.

In the process shown in FIG. 8, the step 812 may alternatively be performed by a centralized processing system (e.g., the card transaction processing system 140) instead of by a processor in the kiosk 110.

Figure 9:
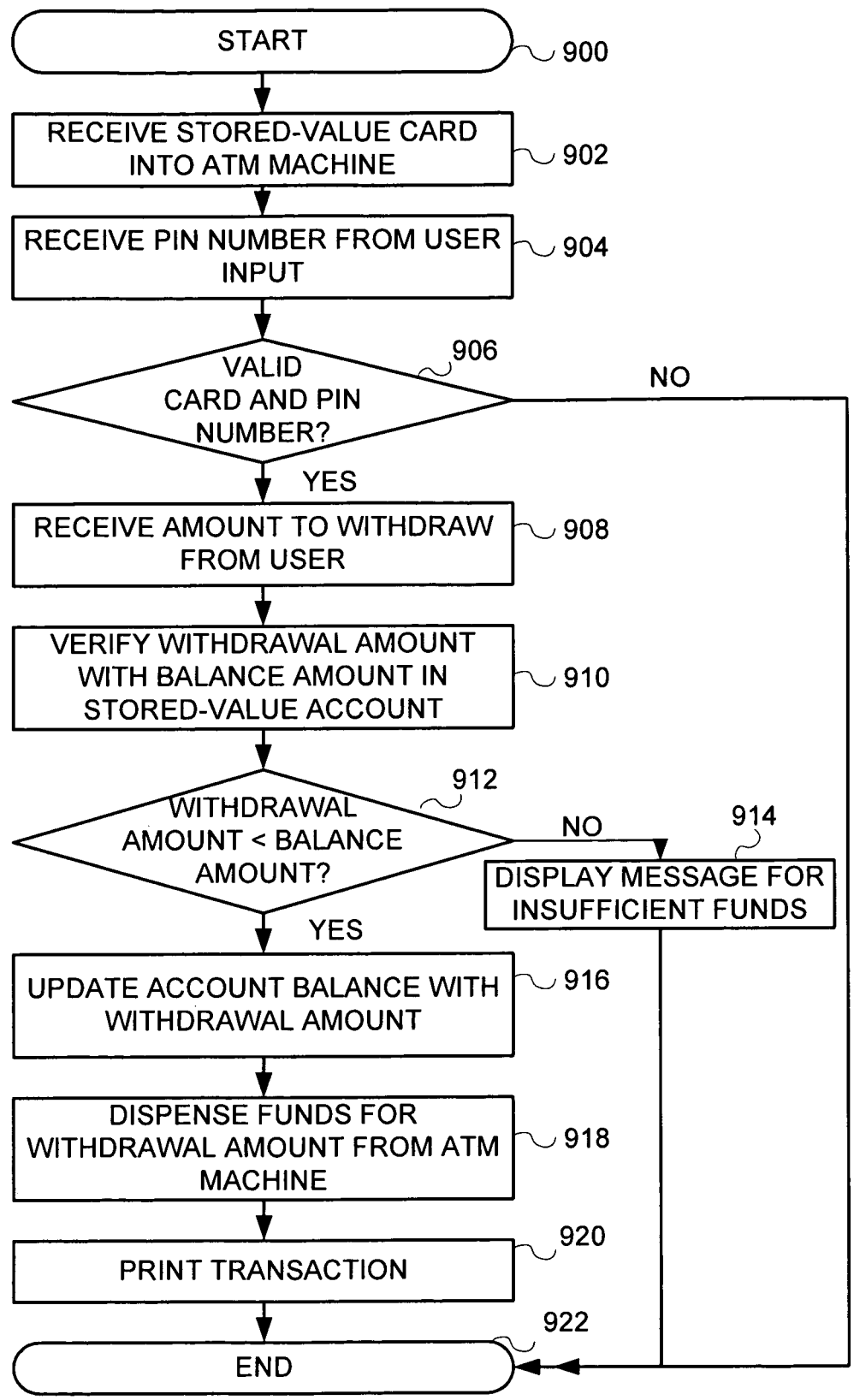
FIG. 9 is a flow chart of an ATM remote access unit for withdrawing funds from a stored-value account in an exemplary embodiment of the invention.

FIG. 9 is a flow chart of a remote access unit for withdrawing funds from a stored-value account in an exemplary embodiment of the invention. FIG. 9 begins in step 900. In step 902, the ATM machine 130 (or any remote access unit) receives the stored-value card. In step 904, the ATM machine 130 receives a PIN number based on the user input. In step 906, the ATM machine 130 checks whether the card and PIN number are valid. If invalid, the process ends in step 922. If valid, the ATM machine 130 receives an amount to withdraw from the user in step 908. In step 910, the ATM machine 130 verifies the withdrawal amount with the balance amount in the stored-value account. In step 912, the ATM machine 130 then determines whether the withdrawal amount is less than the balance amount in the stored-value account.

If the withdrawal amount is greater than the balance amount, the ATM machine 130 displays a message indicating insufficient funds in step 914 prior to ending in step 922. If the withdrawal amount is less than the balance amount, the ATM machine 130 updates the stored-value account balance with the withdrawal amount in step 916. The ATM machine 130 then dispenses funds for the withdrawal amount in step 918. The ATM machine 130 also prints out a receipt for the transaction in step 920. In some embodiments, the kiosk 110 provides statement information that is required by government regulations. The statement information from the kiosk 110 may provide improved customer service for users that are underbanked or unbanked who may not receive mail or may not have access to the Internet. FIG. 9 ends in step 922.

Slight modifications may be made in steps 910-916 to withdraw funds from a stored-value sub-account. The withdrawal process shown in FIG. 9 may also be implemented in a kiosk (e.g., the kiosk 110 in FIG. 1) instead of an ATM machine.

It is appreciated that the processes illustrated in FIGS. 5-9 may be integrated into a single process or any combination thereof. The processes may be carried out by software which is operational when executed by a processor (e.g., the processor 450 or the card transaction processing system 140). The software may be stored in a storage medium (e.g., the storage system 460 or the card transaction processing system 140).

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processors, and storage media.

Figure 10:
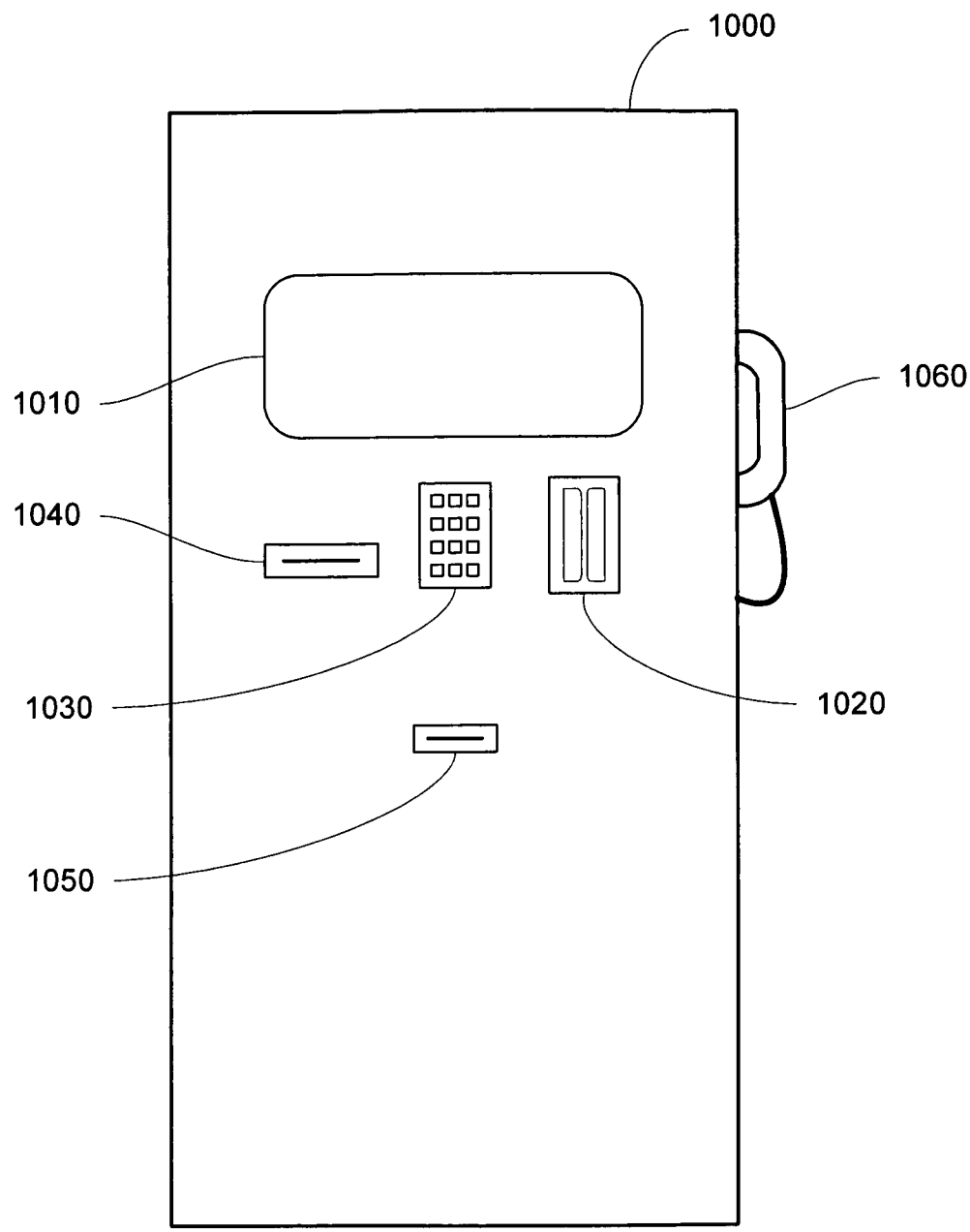
FIG. 10 is a schematic representation of a kiosk according to an exemplary embodiment of the invention.

FIG. 10 illustrates an exemplary embodiment of an automated kiosk 1000 for money remittance. While the kiosk 1000 can additionally include any of the components of kiosk 110 (FIG. 4), in the embodiment shown in FIG. 10 the kiosk 1000 comprises a very simple user interface of only a video display 1010, a card reader 1020, a keypad 1030, a money validation device 1040, and a receipt printer 1050. The kiosk 1000 can optionally comprise a telephone receiver 1060. As described below, the user interface of the kiosk 1000 can be even further simplified, in some embodiments. The various components of the kiosk 1000 will be discussed in greater detail following a discussion of its use with respect to FIG. 11.

The kiosk 1000 can be used to implement a self-service method for money remittance. An exemplary self-service method for money remittance is provided in FIG. 11. The method comprises a sender providing 1100 an access card to the card reader 1020, entering 1110 a PIN on the keypad 1030, and inserting 1120 cash comprising a monetary amount into the money validation device 1040. The access card identifies stored information that is associated with the sender while the PIN provides a level of security that the person possessing the access card is authorized to use the access card. The method can optionally comprise selecting 1130 a recipient. The method can further optionally comprise receiving 1140 a receipt that is dispensed from the receipt printer 1050 of the kiosk 1000. In some embodiments a CLABE number is printed on the receipt. The method is completed when the recipient receives 1150 the monetary amount at another location, such as in another country.

Figure 11:
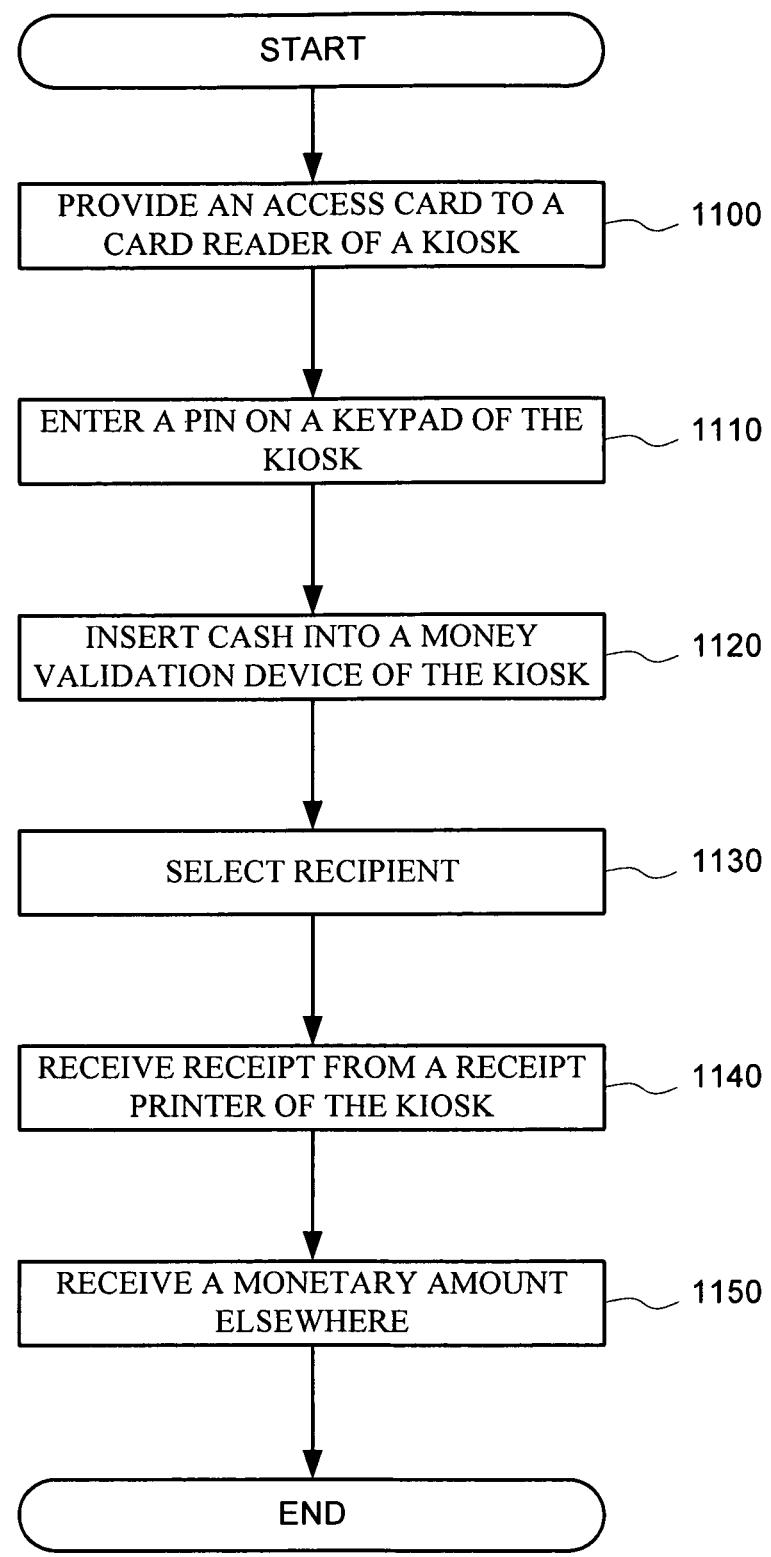
FIG. 11 is a flow chart representation of a self-service method for money remittance, according to an exemplary embodiment of the invention.

Selecting 1130 the recipient is optional because in some situations only one recipient is associated with the access card. In other instances the sender may have a plurality of recipients associated with the access card and in those instances the kiosk 1000 will request that the sender select 1130 which recipient is intended. Although FIG. 11 shows selecting 1130 the recipient after inserting 1120 cash into the money validation device 1040, the order can be reversed. In some embodiments, more than one recipient can be selected 1130, and the kiosk 1000 can prompt the sender to specify the monetary amount to be sent to each.

It will be appreciated that a method for money remittance comprising only steps 1100-1130 in FIG. 11 defines the sender's experience at the kiosk 1000, which is made quick and convenient through the use of the access card. As noted previously, the access card is associated with stored information, and that information includes information necessary to complete the money remittance to the recipient, as described in more detail below. In some embodiments, the sender at the kiosk 1000 is not required to interact with a human agent, complete a form, nor manually enter information at the kiosk 1000, though in some instances a few key strokes may be needed where multiple recipients are selected, for example. It will be appreciated, therefore, that the sender can complete the sender's part of the transaction in little more time than is required to insert 1120 the cash into the money validation device 1040. Furthermore, because the money validation device 1040 is able to authenticate the cash as the cash is received, the recipient can receive 1150 the monetary amount almost as soon as the sender is finished inserting 1120 the cash.

As noted above, the method of FIG. 11 is completed when the recipient receives 1150 the monetary amount. The recipient may receive 1150 the monetary amount in a variety of different ways. In one embodiment, the recipient visits a local financial services office, such as a bank, credit union, or an office of a wire-transfer service such as Western Union. The monetary amount can be received 1150 in the local currency, or in the form of a travelers check, or a stored-value card. In some embodiments, the monetary amount is received 1150 into a bank account where the monetary amount may be accessed, in whole or in part, with an ATM card. The monetary amount may also be received into a stored-value account such as described above, and accessed in whole or in part with a stored-value card.

Returning to the specific components of the kiosk 1000, the video display 1010 can be used, for example, to provide advertising when the kiosk 1000 is not in use. When a sender employs the kiosk 1000, the video display 1010 can be used to provide information to the sender such as instructions (e.g., "Enter Your PIN Now"), details about an exchange rate, the transaction fee, the amount of cash that has been inserted, and so forth. In some embodiments, the video display 1010 comprises a touch-screen and in further embodiments can replace the keypad 1030. A touch-screen video display 1010 can provide versatility, for example, by allowing the sender to select a different language for the display. As provided above, the access card can be linked to information pertaining to multiple recipients and the touch-screen video display 1010 can be used as the interface for selecting 1130 the desired recipient from a displayed list.

Further, although the kiosk 1000 is intended for rapid and automated money remittance to established recipients, the kiosk 1000 can also be used to establish a new recipient. Here, a touch-screen video display 1010 can be employed to select the option of setting up a new recipient. In some instances, information pertaining to the new recipient can be entered through the touch-screen video display 1010. In other instances, the video display 1010 will instruct the sender to use the telephone receiver 1060 to talk to a customer service representative.

The card reader 1020 can be a magnetic card reader that reads a magnetic stripe on the access card. In other embodiments, the card reader 1020 can take other forms to facilitate the use of other card technologies. For example, the card reader 1020 can be an optical scanner or an RFID reader.

The keypad 1030 here is merely a representative example of a user identification device. In other embodiments, the kiosk 1000 can comprise, in the place of the keypad 1030, a biometric capture system, such as a retina scanner or a fingerprint reader, to provide user identification information. It will be understood that user identification may not be strictly required to merely remit funds to a recipient, however, user identification is desirable before the sender can view certain information that can be made available by the kiosk 1000. For example, with user identification, the sender can view records of prior transactions on the video display 1010.

Turning to the access card, the purpose of the access card is to allow access to stored information for facilitating a money remittance transaction. Accordingly, the access card need only encode an identifier that is associated with the sender and the stored information, such as a card number or an alphanumeric string of characters. The access card can be a stored-value card, such as described above, or more generally any plastic card with a magnetic strip having a unique identifier encoded thereon. While such a card can comprise an ATM card or a credit card, the access card can also be a membership card, a grocery store club card, and so forth. In one embodiment, the access card and the kiosk 1000 both carry a common brand, logo, design, or trademark so that the sender can readily associate the access card with the kiosk 1000.

As noted above, the access card is associated with stored information, maintained in a database, and pertaining to the sender and one or more recipients. The stored information can include for each established recipient such information as is necessary to complete the monetary remittance such as the recipient's name, phone number, routing number, account number, CLABE number, and so forth.

Returning to FIG. 10, the kiosk 1000 is part of a money remittance system akin to the system 100 (FIG. 1). Thus, in addition to the user interface described above, the kiosk 1000 further comprises a processor (not shown) such as processor 450 (FIG. 4) coupled to a communication network interface (not shown) such as communication network interface 470 (FIG. 4) for communicating with a communication network (not shown) such as communication network 120 (FIG. 1). The communication network connects the processor of the kiosk 1000 to a processing system such as card transaction processing system 140 (FIG. 1) that can include a database and is connected to various financial networks (e.g., $3^{rd}$ party financial network 160 in FIG. 1). Accordingly, the processor in the kiosk 1000 can obtain from the database information associated with an access card and transmit information back to the processing system regarding the intended recipient and the cash amount received by the kiosk 1000. The processing system optionally is also connected to the government database 150 (FIG. 1) for the purposes described above.

Figure 12:
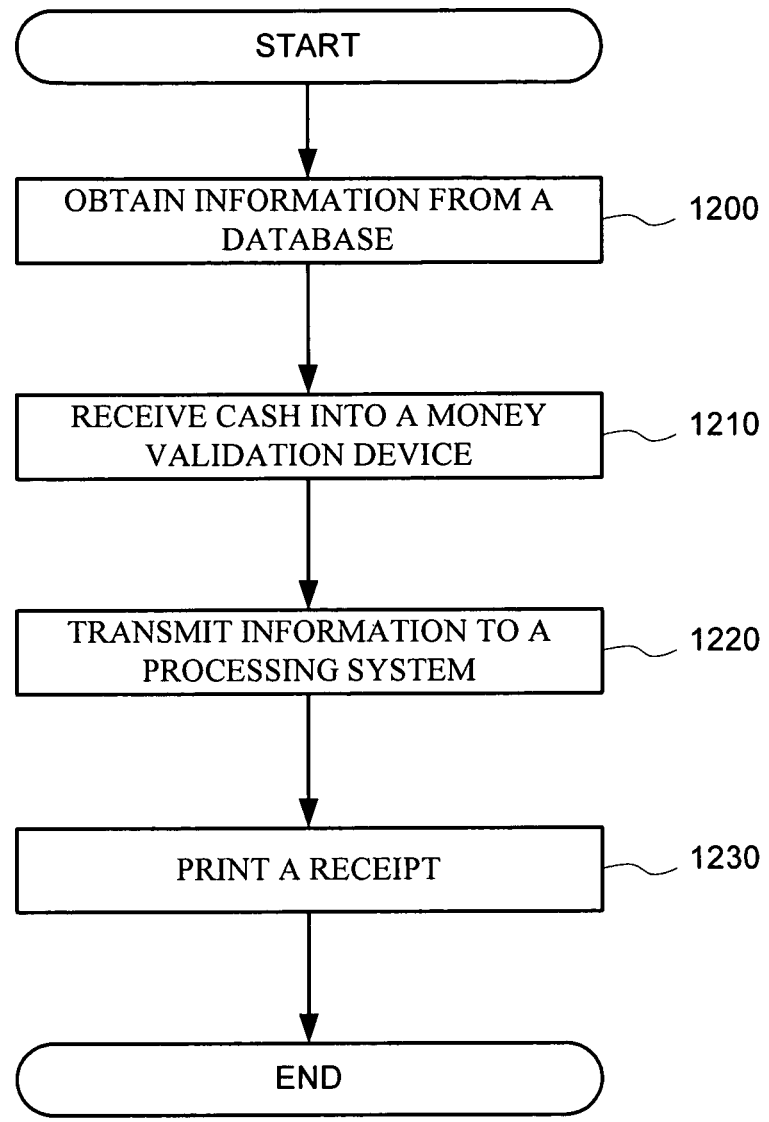
FIG. 12 is a flow chart representation of a method for money remittance, according to another exemplary embodiment of the invention.

FIG. 12 provides an exemplary method for international money remittance as can be executed, for example, by the kiosk 1000. The method comprises obtaining 1200 from a database information associated with an access card, receiving 1210 cash into a money validation device 1040, transmitting 1220 to a processing system information pertaining to a money remittance transaction, and printing 1230 a receipt.

Obtaining 1200 information associated with an access card from a database can include reading the access card to obtain an identifier, such as a card number, and sending the identifier to the processing system. The processing system then searches the database for information associated with the identifier and sends at least some of the information back to the kiosk 1000. The information associated with the identifier can include a sender's name, a list of established recipients, and further information pertaining to each recipient such as a financial institution and CLABE number. Obtaining 1200 information associated with the access card can also comprise verifying a PIN, either by the processing system or by the kiosk 1000.

It will be appreciated that not all of the associated information needs to be obtained 1200 by the kiosk 1000. Thus, obtaining 1200 information associated with the access card can comprise obtaining an initial subset, such as just the sender's name and the list of established recipients, but not the specific details for each established recipient. After the sender has selected a recipient from the list, in some embodiments, obtaining 1200 information can further comprise receiving information pertaining to that recipient, such as a CLABE number.

Receiving 1210 cash into the money validation device 1040 can comprise tabulating a sum value of the cash received. Although FIG. 12 shows receiving 1210 cash as following obtaining 1200 information, it will be appreciated that cash can be received 1210 either before or while information is being obtained 1200.

Transmitting 1220 to the processing system information pertaining to the money remittance can comprise sending the cash amount to the processing system. Transmitting 1220 information pertaining to the money remittance can also comprise sending a selected recipient to the processing system.

Once the processing system has received this information, the processing system can make determinations such as fees and exchange rates. The processing system can also check information against the government database 150. The processing system can also calculate the monetary amount by subtracting any fees from the sum value. Then, the processing system can send information back to the kiosk 1000 for display to the sender, such the amount of any fees, the monetary amount to be remitted to the recipient, the exchange rate, and so forth. In response to such information in some embodiments, the kiosk 1000 can allow the sender to cancel the money remittance or modify the money remittance transaction, for instance, by changing the recipient or inserting more cash. To complete the money remittance transaction, the processing system credits the monetary amount to the designated recipient according to the stored instructions for the recipient, and credits any fees to respective accounts.

Again, it will be understood that although numerous alternatives have been disclosed above, all of the options provided by the kiosk 1000 are truly optional. Where only one recipient is associated with an access card, a very simplified self-service method at the kiosk 1000 comprises merely-swiping the access card and inserting cash, without entering a PIN or dispensing a receipt. In such an embodiment, after the sender swipes the access card, the kiosk 1000 can display a message such as "You have begun a money transfer to (recipient) in (location). To complete the transfer, insert your cash now." As the sender adds cash, the kiosk can display the sum value of the inserted cash, any fee, and the monetary amount that will be sent in the foreign currency, for instance. When the sender steps away from the kiosk, a sensor (e.g., an infrared sensor in the kiosk 1000 or a pressure sensor on the ground in front of the kiosk 1000) can indicate that the sender is finished and the monetary amount will be credited to the recipient. Since a PIN is not provided in this embodiment, access to sensitive information would not be made available through the kiosk 1000.

Similarly, the access card itself is also optional in some embodiments. The same essential method can be achieved with a biometric capture system in place of the card reader 1020. Here, a simplified embodiment comprises the sender merely pressing a finger on a fingerprint reader and inserting cash into the money validation device 1040. As the fingerprint also serves as a personal identifier, here the kiosk 1000 could permit access to sensitive information.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A self-service method for money remittance comprising:
   receiving a customer identifier input by a customer through a customer input device of an automated kiosk located in a first country, the customer identifier identifying the customer and being associated with stored information in a database necessary to complete a money remittance to a recipient;
   identifying the customer by the automated kiosk based on the received customer identifier and the stored information in the database;
   receiving a verification response that indicates to the identified customer at the automated kiosk that the identified customer passes compliance tests, the verification based on a comparison of customer data with government data and compliance regulations, the customer data sent to an external database able to initiate a comparison of the customer data with the government data and the compliance regulations;
   receiving cash input by the customer into a money validation device of the automated kiosk, the cash comprising a monetary amount;
   validating the authenticity of the received cash by the validation device;
   providing a list of one or more established recipients by the automated kiosk, wherein the customer and an established recipient in the list of one or more established recipients form a unique sender-recipient pair; and
   confirming a selection of the recipient, wherein the list of one or more established recipients is based on the received customer identifier and the information stored in the database, and the recipient is from the one or more established recipients displayed on a touch-screen of the automated kiosk.

2. The method of claim 1 further comprising receiving a PIN.

3. The method of claim 1 further comprising providing a receipt.

4. The method of claim 1 further comprising receiving the monetary amount at a financial services office located in a second country.

5. The method of claim 4 wherein the financial services office comprises an office of an international wire-transfer service.

6. The method of claim 4 wherein the financial services office comprises an office of a bank.

7. The method of claim 1 wherein information pertaining to each of the one or more established recipients includes a CLABE number.

8. The method of claim 1 further comprising receiving a receipt including a CLABE number from the kiosk.

9. A self service kiosk for money remittance comprising:
a customer input device configured to receive a customer identifier input by a customer;
a money validation device; and
a processor coupled to the customer input device and the money validation device and configured to execute software for controlling the self service kiosk to:
obtain a customer identifier received from the customer via the customer input device,
identify the customer based on the customer identifier,
obtain identifier information from a database,
receive a verification response that indicates to the identified customer at the self service kiosk that the identified customer passes compliance tests, the verification based on a comparison of customer data with government data and compliance regulations, the customer data sent to an external database able to initiate a comparison of the customer data with the government data and the compliance regulations;
receive cash input by the customer into the money validation device of the kiosk, the cash comprising a monetary amount,
validate the authenticity of the received cash by the cash validation device,
provide a list of one or more established recipients, wherein the customer and an established recipient in the list of one or more established recipients form a unique sender-recipient pair,
confirm a selection of a recipient, and
transmit to a processing system money remittance information including the cash amount,
wherein the list of one or more established recipients is based on the received customer identifier and the information stored in the database, and
the recipient is from the one or more established recipients displayed on a touch-screen of the automated kiosk.

10. The self service kiosk of claim 9 wherein the information associated with the identifier includes the list of one or more established recipients.

11. The self service kiosk of claim 10 wherein the information pertaining to the money remittance further includes the recipient selected from the list of one or more established recipients.

12. The self service kiosk of claim 9 further comprising a keypad connected to the processor.

13. The self service kiosk of claim 9 further comprising a receipt printer coupled to the processor.

14. The self service kiosk of claim 9 further comprising a telephone receiver.

15. A method for money remittance by an automated kiosk including a card reader and a money validation device, the method comprising:
reading an identifier from an access card provided by a customer by the automated kiosk;
receiving a verification response that indicates to the identified customer at the automated kiosk that the identified customer passes compliance tests, the verification based on a comparison of customer data with government data and compliance regulations, the customer data sent to an external database able to initiate a comparison of the customer data with the government data and the compliance regulations;
obtaining from a database information associated with the identifier including a list of one or more established recipients, wherein the customer of the automated kiosk and an established recipient in the list of one or more established recipients form a unique sender-recipient pair;
receiving cash input by the customer comprising a sum value into the money validation device of the automated kiosk; and
transmitting to a processing system information pertaining to a money remittance including the sum value and a selected recipient,
wherein the list of one or more established recipients is based on the received customer identifier and the information stored in the database, and
the recipient is from the one or more established recipients displayed on a touch-screen of the automated kiosk.

16. The method of claim 15 wherein the information pertaining to the money remittance further includes the recipient selected from the list.

17. The method of claim 1, wherein confirming includes receiving a selection of the recipient from the customer.

18. The method of claim 1, wherein confirming includes automatically transmitting information to a processing system to credit the monetary amount to the selected recipient according to stored instructions for the selected recipient.

19. A self-service method for money remittance comprising:
receiving a customer identifier input by a customer through a customer input device of an automated kiosk located in a first country, the customer identifier identifying the customer and being associated with stored information in a database necessary to complete a money remittance to a recipient;
identifying the customer by the automated kiosk and verifying the identify of the customer by the automated kiosk, the customer identification based on the received customer identifier and information stored in the database, the verification of the customer identity including receiving a verification response that indicates to the identified customer at the automated kiosk that the identified customer passes compliance tests, the verification based on a comparison of customer data with government data and compliance regulations, the customer data sent to an external database able to initiate a comparison of the customer data with the government data and the compliance regulations;

receiving cash input by the customer into a money validation device of the automated kiosk, the cash comprising a monetary amount;

validating the authenticity of the received cash by the validation device;

providing a list of one or more established recipients by the automated kiosk, wherein the customer and an established recipient in the list of one or more established recipients form a unique sender-recipient pair; and confirming a selection of the recipient, wherein the list of one or more established recipients is based on the received customer identifier and the information stored in the database, and the recipient is from the one or more established recipients displayed on a touch-screen of the automated kiosk.

20. The method of claim 19, wherein verifying the identity of the customer includes processing biometric data for a customer and received by the automated kiosk.

21. The method of claim 19, wherein the stored information includes information pertaining to the customer and one or more of the established recipients, each combination of the customer and an established recipient forming a unique sender-recipient pair, each unique sender-recipient pair previously confirmed by the customer.

22. The method of claim 19, wherein verifying the identity of the customer includes communicating with an external verification system.

* * * * *